US012292952B2

(12) United States Patent
Okuyama

(10) Patent No.: US 12,292,952 B2
(45) Date of Patent: May 6, 2025

(54) INFORMATION PROCESSING DEVICE, SYSTEM, METHOD, AND STORAGE MEDIUM FOR UPDATING REGISTERED FACIAL IMAGE

(71) Applicant: NEC Corporation, Tokyo (JP)

(72) Inventor: Yoshiaki Okuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 230 days.

(21) Appl. No.: 17/918,363

(22) PCT Filed: Apr. 24, 2020

(86) PCT No.: PCT/JP2020/017662
§ 371 (c)(1),
(2) Date: Oct. 12, 2022

(87) PCT Pub. No.: WO2021/214970
PCT Pub. Date: Oct. 28, 2021

(65) Prior Publication Data
US 2023/0145344 A1 May 11, 2023

(51) Int. Cl.
G06F 21/32 (2013.01)
G06F 16/51 (2019.01)
G06F 21/62 (2013.01)
G06V 40/16 (2022.01)
G06V 40/50 (2022.01)

(52) U.S. Cl.
CPC ............. G06F 21/32 (2013.01); G06F 16/51 (2019.01); G06F 21/6245 (2013.01); G06V 40/172 (2022.01); G06V 40/50 (2022.01)

(58) Field of Classification Search
CPC ...... G06F 21/32; G06F 16/51; G06F 21/6245; G06V 40/172; G06V 40/50; G06V 10/25
See application file for complete search history.

(56) References Cited

U.S. PATENT DOCUMENTS

| 10,332,191 B1 * | 6/2019 | Eckel | G06Q 20/352 |
| 11,288,530 B1 * | 3/2022 | Genner | G06F 21/32 |
| 2005/0210267 A1 * | 9/2005 | Sugano | H04W 12/069 713/186 |

(Continued)

FOREIGN PATENT DOCUMENTS

| JP | 2004-126813 A | 4/2004 |
| JP | 2008-257365 A | 10/2008 |

(Continued)

OTHER PUBLICATIONS

International Search Report for PCT Application No. PCT/JP2020/017662, mailed on Jun. 30, 2020.

(Continued)

Primary Examiner — Jimmy H Tran
(74) Attorney, Agent, or Firm — Sughrue Mion, PLLC

(57) ABSTRACT

Provided is an information processing device that prevents fraudulent updating of registered facial images. The information processing device comprises a database and an updating unit. The database stores a first facial image of a user. In accordance with at least the similarity between the first facial image and a second facial image, the updating unit determines whether to update the first facial image using the second facial image.

15 Claims, 28 Drawing Sheets

(56) References Cited

U.S. PATENT DOCUMENTS

| | | | |
|---|---|---|---|
| 2010/0071041 A1* | 3/2010 | Ikegami | G06F 21/32 726/6 |
| 2012/0054734 A1* | 3/2012 | Andrews | G06F 8/65 717/171 |
| 2014/0157433 A1* | 6/2014 | Gomi | H04L 63/10 726/28 |
| 2016/0127363 A1* | 5/2016 | Vea Orte | G07C 9/37 726/4 |
| 2019/0034935 A1* | 1/2019 | Zhai | G06Q 20/40145 |
| 2019/0156020 A1* | 5/2019 | Sato | H04L 9/0894 |
| 2019/0190718 A1* | 6/2019 | Wease | H04L 9/3242 |
| 2019/0362458 A1* | 11/2019 | Poder | G06F 21/6245 |
| 2020/0042685 A1* | 2/2020 | Tussy | G06V 40/167 |
| 2020/0082088 A1* | 3/2020 | Muthukumaran | G06F 21/64 |
| 2020/0105080 A1* | 4/2020 | Maeno | G07C 9/00563 |
| 2021/0006558 A1* | 1/2021 | Jung | H04W 12/06 |
| 2021/0051168 A1* | 2/2021 | Mei | H04L 63/205 |
| 2021/0111891 A1* | 4/2021 | Inoue | G06Q 10/06311 |
| 2021/0320916 A1* | 10/2021 | Liu | G06V 40/168 |
| 2022/0147604 A1* | 5/2022 | Ozono | G06F 21/45 |
| 2022/0148354 A1* | 5/2022 | Ozono | G06T 7/00 |
| 2022/0270105 A1* | 8/2022 | Kawase | G06F 21/30 |
| 2022/0277065 A1* | 9/2022 | Patel | G06F 21/32 |
| 2022/0405368 A1* | 12/2022 | Hayase | G06F 21/32 |
| 2022/0415105 A1* | 12/2022 | Maeno | G06V 40/172 |
| 2023/0031087 A1* | 2/2023 | Tussy | G06F 21/32 |
| 2023/0036355 A1* | 2/2023 | Suzuki | G06F 21/32 |
| 2023/0084897 A1* | 3/2023 | Ryoo | G06V 40/168 705/44 |
| 2023/0086771 A1* | 3/2023 | Yokoyama | G07C 9/38 726/19 |
| 2023/0113793 A1* | 4/2023 | Yuki | G06Q 10/083 705/44 |
| 2023/0145344 A1* | 5/2023 | Okuyama | G06V 40/172 726/18 |
| 2023/0153411 A1* | 5/2023 | Okuyama | G06F 21/6245 726/6 |
| 2023/0156003 A1* | 5/2023 | Okuyama | H04L 63/0861 726/3 |
| 2023/0164142 A1* | 5/2023 | Okuyama | H04W 12/02 726/7 |
| 2023/0195868 A1* | 6/2023 | Nakamura | A61B 5/1171 |
| 2024/0054199 A1* | 2/2024 | Chen | G06F 21/32 |
| 2024/0205218 A1* | 6/2024 | Cronkright | H04L 9/3228 |

FOREIGN PATENT DOCUMENTS

| | | |
|---|---|---|
| JP | 2009-110147 A | 5/2009 |
| JP | 2015-176208 A | 10/2015 |
| JP | 2017-084025 A | 5/2017 |

OTHER PUBLICATIONS

English translation of Written opinion for PCT Application No. PCT/JP2020/017662, mailed on Jun. 30, 2020.

* cited by examiner

Fig. 18

AUTHENTICATION INFORMATION DATABASE

| USER ID (uID) | PASSWORD (PW) | FEATURE AMOUNT | FACIAL IMAGE | SERVICE PROVIDER ID (spID) | SERVICE USER ID (suID) |
|---|---|---|---|---|---|
| ... | ... | ... | ... | ... | ... |
| U1 | PW1 | FV1 | F1 | — | — |

Fig. 19

AUTHENTICATION INFORMATION DATABASE

| USER ID (uID) | PASSWORD (PW) | FEATURE AMOUNT | FACIAL IMAGE | SERVICE PROVIDER ID (spID) | SERVICE USER ID (suID) |
|---|---|---|---|---|---|
| ... | ... | ... | ... | ... | ... |
| U1 | PW1 | FV1 | F1 | S1 | U1S1 |

Fig. 20

AUTHENTICATION INFORMATION DATABASE

| USER ID (uID) | PASSWORD (PW) | FEATURE AMOUNT | FACIAL IMAGE | SERVICE PROVIDER ID (spID) | SERVICE USER ID (suID) |
|---|---|---|---|---|---|
| ... | ... | ... | ... | ... | ... |
| U1 | PW1 | FV1 | F1 | S1 | U1S1 |
| | | | | S2 | U1S2 |
| U2 | PW2 | FV2 | F2 | S1 | U2S1 |

Fig. 22

SERVICE REGISTRATION

ENTER FOLLOWING INFORMATION.

NAME

ADDRESS

...

IF YOU WANT TO RECEIVE SERVICE BY FACE AUTHENTICATION, ENTER ID AND PASSWORD REGISTERED IN AUTHENTICATION CENTER.

ID

PASSWORD

ENTER

Fig. 23

USER INFORMATION DATABASE

| PERSONAL INFORMATION | SERVICE USER ID (suID) |
|---|---|
| ... | ... |
| Name, Address, ... | U1S1 |

INFORMATION PROCESSING DEVICE, SYSTEM, METHOD, AND STORAGE MEDIUM FOR UPDATING REGISTERED FACIAL IMAGE

This application is a National Stage Entry of PCT/JP2020/017662 filed on Apr. 24, 2020, the contents of all of which are incorporated herein by reference, in their entirety.

TECHNICAL FIELD

The present disclosure relates to an information processing device, a system, a facial image update method, and a storage medium.

BACKGROUND ART

In recent years, various services using biometric information have started to spread. For example, face authentication is used for various procedures (check in, baggage check, etc.) performed in an airport, check in to a hotel, and the like.

In the service using the face authentication, processing is performed in the following flow. First, a terminal (a terminal installed in an airport or a hotel) acquires a facial image of a user, and generates a feature amount (feature vector) characterizing the facial image. The generated feature amount is transmitted to a server on the network.

The server includes a database that stores biometric information and personal information (name, address, etc.) of a user who receives a service by face authentication. When acquiring the collation request from the terminal, the server searches (collates) the database, and identifies the biometric information and the personal information related to the collation request from the terminal. The server transmits the identified personal information to the terminal, and the terminal installed at an airport or the like performs a task based on the acquired personal information.

Technology development related to authentication using biometric information is progressing.

For example, PTL 1 describes that collation accuracy in a system for collating whether a face included in a captured image is an already registered face is improved by similarity between the face included in the captured image and the face included in a registered image registered in advance.

PTL 2 describes that a biometric authentication transaction system using a mobile terminal achieves a method of securely updating biometric information on the mobile terminal and the terminal itself.

CITATION LIST

Patent Literature

[PTL 1] JP 2015-176208 A
[PTL 2] JP 2008-257365 A

SUMMARY OF INVENTION

Technical Problem

A user who has registered a facial image in the system may want to update the facial image registered at the start of use of the system. In this case, when the update of the facial image is permitted without any confirmation, the facial image of another person can be registered, and there is room for fraud. PTLs 1 and 2 do not disclose a technique for solving the above fraud.

A main object of the present disclosure, is to provide an information processing device, a system, a facial image update method, and a storage medium that contribute to preventing unauthorized update of a registered facial image.

Solution to Problem

According to a first aspect of the present disclosure, there is provided an information processing device including a database that stores a first facial image of a user, and an update unit that determines, at least according to similarity between the first facial image and a second facial image, whether to update the first facial image to the second facial image.

According to a second aspect of the present disclosure, there is provided a system including a terminal, and an information processing device including a database that stores a first facial image of a user and an update unit that determines, at least according to similarity between the first facial image and a second facial image, whether to update the first facial image to the second facial image, wherein the terminal inputs the second facial image to the information processing device according to an operation of the user.

According to a third aspect of the present disclosure, there is provided a method of updating a facial image, where the method includes an information processing device storing a first facial image of a user; and determining, at least according to similarity between the first facial image and a second facial image, whether to update the first facial image to the second facial image.

According to a fourth aspect of the present disclosure, there is provided a computer-readable storage medium storing a program for causing a computer mounted on an information processing device to execute a process of storing a first facial image of a user, and a process of determining, at least according to similarity between the first facial image and a second facial image, whether to update the first facial image to the second facial image.

Advantageous Effects of Invention

According to each aspect of the present disclosure, there are provided an information processing device, a system, a facial image update method, and a storage medium that contribute to preventing unauthorized update of a registered facial image. The effect of the present disclosure is not limited to the above. According to the present disclosure, other effects may be exhibited instead of or in addition to the effect.

BRIEF DESCRIPTION OF DRAWINGS

FIG. 18 is a diagram illustrating an example of an authentication information database.

FIG. 19 is a diagram illustrating an example of an authentication information database.

FIG. 20 is a diagram illustrating an example of an authentication information database.

FIG. 22 is a diagram for explaining an operation of a personal information acquisition unit of the management server according to the first example embodiment.

FIG. 23 is a diagram illustrating an example of a user information database.

EXAMPLE EMBODIMENT

Figure 1:
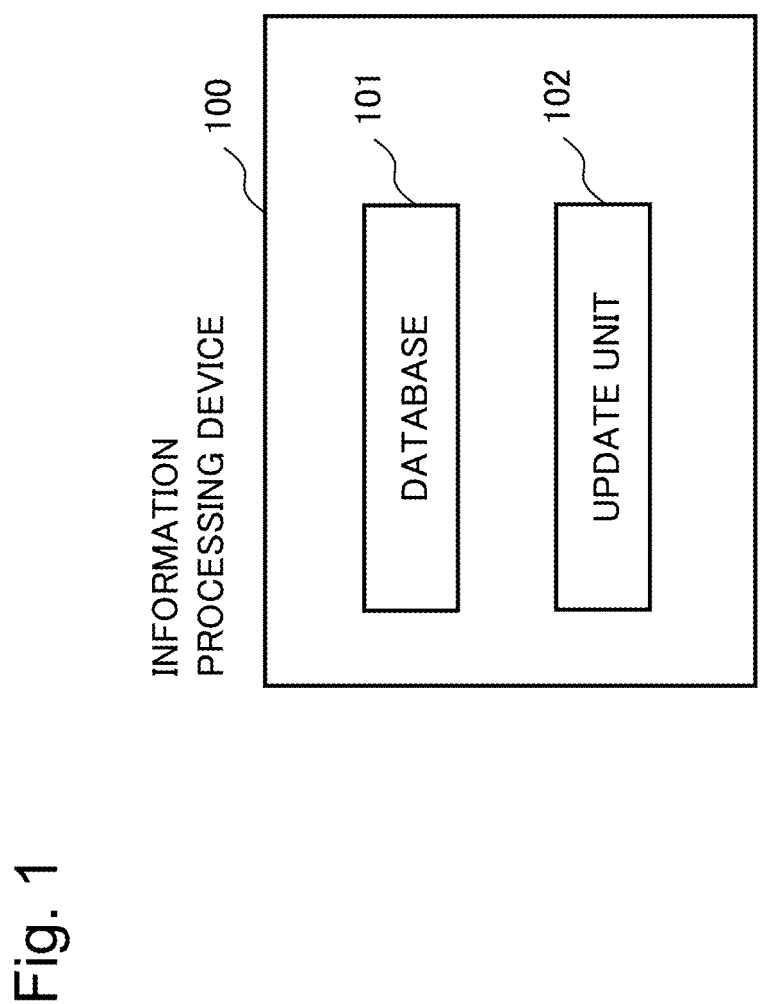
FIG. 1 is a diagram for describing an outline of an example embodiment.

First, an outline of an example embodiment will be described. The reference numerals in the drawings attached to this outline are attached to respective elements for convenience as an example for assisting understanding, and the description of this outline is not intended to be any limitation. Unless there is a specific reason to the contrary, the block described in each drawing represents not a configuration of a hardware unit but a configuration of a functional unit. Connection lines between blocks in each drawing include both bidirectional and unidirectional lines. The unidirectional arrow schematically indicates a flow of a main signal (data), and does not exclude bidirectionality. In the present specification and the drawings, elements that can be similarly described are denoted by the same reference numerals, and redundant description can be omitted.

An information processing device 100 according to an example embodiment includes a database 101 and an update unit 102 (see FIG. 1). The database 101 stores a first facial image of a user. At least according to similarity between the first facial image and a second facial image, the update unit 102 determines whether to update the first facial image to the second facial image.

When updating the facial image registered in the system, the information processing device 100 calculates similarity between the already registered facial image (first facial image) and the facial image for update (second facial image). In a case where the information processing device 100 determines that the two facial images are facial images of the same person from the calculated similarity, the information processing device updates the registered facial image. As a result, it is possible to prevent unauthorized update such as registration of another person's facial image in the system.

Hereinafter, specific example embodiments will be described in more detail with reference to the drawings.

First Example Embodiment

The first example embodiment will be described in more detail with reference to the drawings.

Configuration of System

Figure 2:
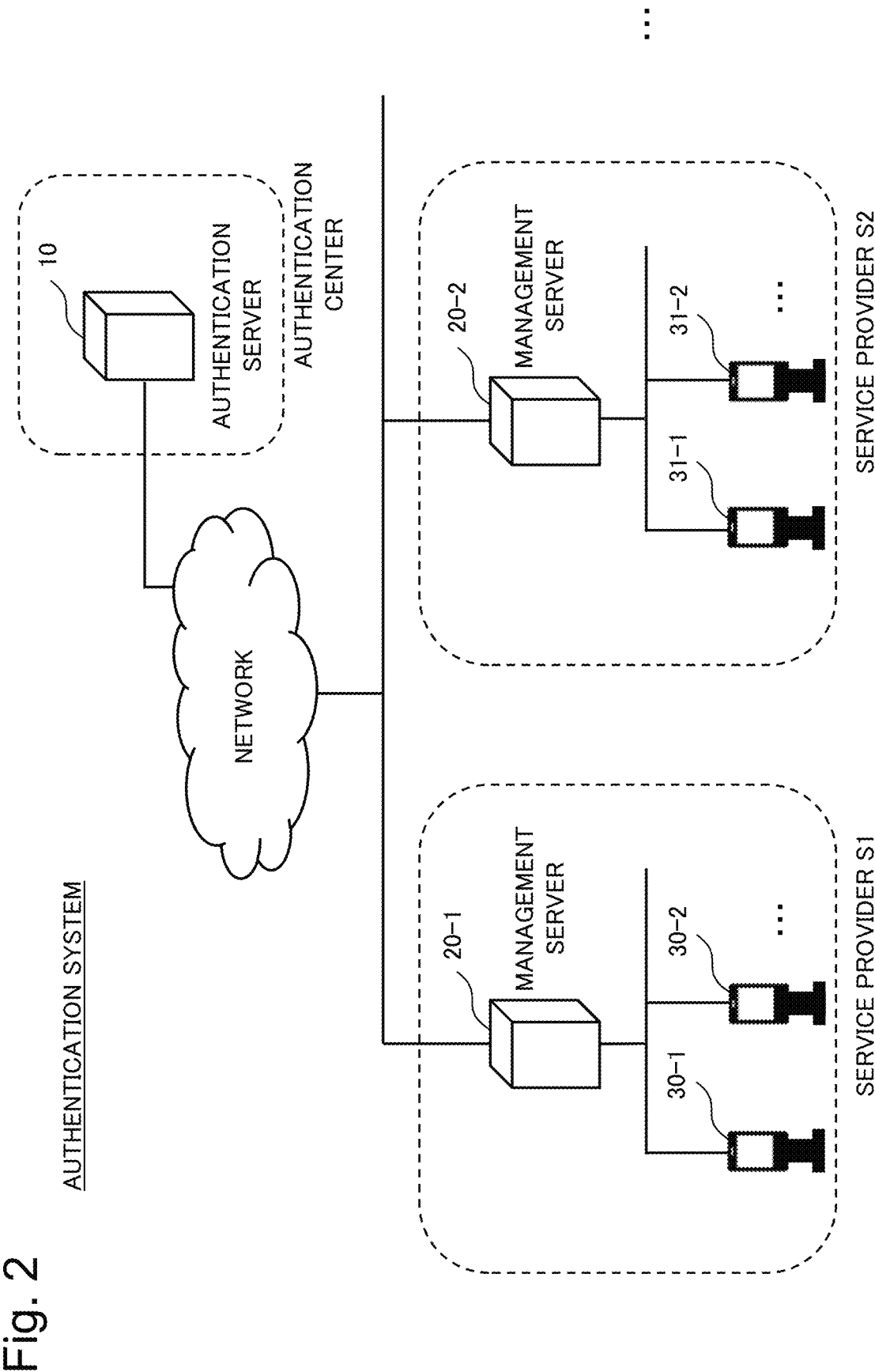
FIG. 2 is a diagram illustrating an example of a schematic configuration of an authentication system according to the first example embodiment.

FIG. 2 is a diagram illustrating an example of a schematic configuration of the authentication system according to the first example embodiment. As illustrated in FIG. 2, the authentication system includes an authentication center and a plurality of service providers.

Each service provider participating in the authentication system provides a service using biometric authentication. Examples of the service provided by the service provider include a payment settlement service at a retail store or the like and an accommodation service at a hotel or the like. Alternatively, the service provided by the service provider may be an entrance examination or the like at an airport or a sea port. The service provider of the present disclosure is only required to be able to provide any service that can be provided using biometric authentication.

An authentication server 10 is installed in the authentication center. The authentication server 10 is an information processing device that operates as a certificate authority of authentication using biometric information. The authentication server 10 may be a server installed on the site of the authentication center or a server installed on a cloud.

The biometric information of the user includes, for example, data (feature amount) calculated from physical characteristics unique to an individual, such as a pattern of a face, a fingerprint, a voiceprint, and a vein, a retina, and an iris of a pupil. Alternatively, the biometric information of the user may be image data such as a facial image and a fingerprint image. The biometric information of the user may include the physical characteristics of the user as information.

The authentication server 10 is a server device for implementing a service by biometric authentication. The authentication server 10 processes an "authentication request" transmitted from each service provider to transmit a result of the authentication process to the service provider.

Each service provider has a management server and an authentication terminal.

For example, a service provider S1 has a management server 20 and a plurality of authentication terminals 30. A service provider S2 has a management server 20 and a plurality of authentication terminals 31.

In the following description, in a case where it is necessary to distinguish each component, a reference sign right of a hyphen is used. Since the operations and the like of the respective devices included in the service provider S1 and the service provider S2 can be the same, the following description will focus on the service provider S1.

The devices illustrated in FIG. 2 are connected to each other. For example, the authentication server 10 and the management server 20 are connected by wired or wireless communication means, and are configured to be able to communicate with each other.

The management server 20 is a server that controls and manages the overall operations of the service provider. For example, in a case where the service provider is a retail store, the management server 20 performs product inventory management and the like. Alternatively, when the service provider is a hotel business operator, the management server 20 manages reservation information of guests and the like.

The management server 20 includes a control function and a management function related to biometric authentication of the user in addition to the function related to the service provision.

The authentication terminal 30 is a device serving as an interface of a user (guest) who has visited a service provider. The user receives various services via the authentication terminal 30. For example, in a case where the service provider is a retail store, the user makes payment using the authentication terminal 30. Alternatively, when the service provider is a hotel business operator, the user performs a check in procedure using the authentication terminal 30.

FIG. 2 is an example and is not intended to limit the configuration and the like of the authentication system of the present disclosure. For example, the authentication center may include two or more authentication servers 10. Alternatively, the service provider may include at least one or more authentication terminals 30. Alternatively, the functions of the management server 20 and the authentication terminal 30 may be integrated, and a service using biometric authentication may be provided by one integrated device. Alternatively, in each service provider, a plurality of authentication terminals 30 may be connected to one management server 20 as illustrated in FIG. 2, or one authentication terminal 30 may be connected to one management server 20.

Outline Operation of System

Next, a schematic operation of the authentication system according to the first example embodiment will be described.

The operation of the authentication system includes three phases.

The first phase is a phase (user registration phase) in which system registration of the user is performed.

The second phase is a phase (service registration phase) in which service registration is performed.

The third phase is a phase (service providing phase) in which a service using biometric authentication is provided to the user.

User Registration Phase

Figure 3:
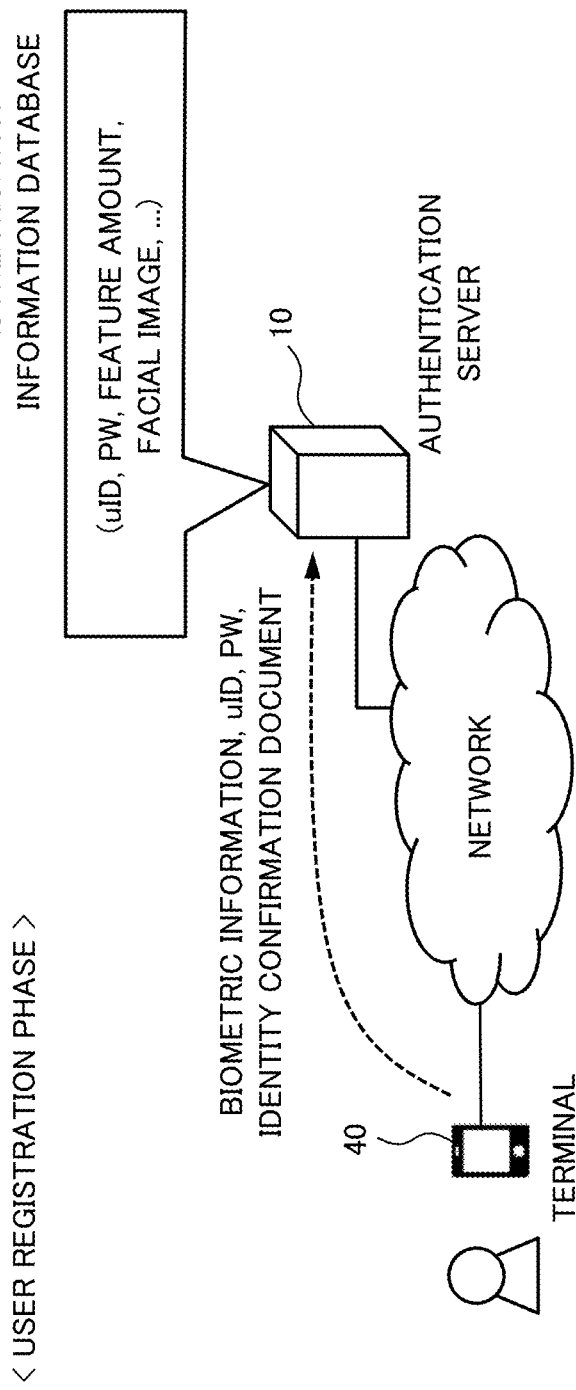
FIG. 3 is a diagram for explaining an operation in a user registration phase of the authentication system according to the first example embodiment.

FIG. 3 is a diagram for describing an operation in a user registration phase of the authentication system according to the first example embodiment.

A user who wants to receive a service using biometric authentication performs user registration in advance. The user determines information (User ID (Identifier), password (PW; Pass Word)) for identifying the user himself/herself in the authentication system, and registers the information in the system. In the drawings including FIG. 3, the user ID is denoted as a "uID".

The user registers his/her own biometric information (for example, a facial image) and an identity confirmation document (for example, a passport or the like) in the system. The user registers the four pieces of information (user ID, password, biometric information, identity confirmation document) in the system using any means.

For example, the user may input his/her own facial image captured by operating a possessed terminal 40, the user ID, the password, and the identity confirmation document to the authentication server 10. Examples of the terminal 40 include a mobile terminal device such as a smartphone, a mobile phone, a game machine, and a tablet, a computer (personal computer, notebook computer), and the like.

The authentication server 10 performs identity confirmation of the user using the acquired facial image and identity confirmation document. Specifically, in a case where the acquired facial image and the facial image described in the identity confirmation document are facial images of the same person, the authentication server 10 determines that the system registration application is made by the user himself/herself.

Thereafter, the authentication server 10 generates a feature amount (a feature vector including a plurality of feature amounts) from the acquired facial image, and stores the feature amount, the facial image, the user ID, and the password in the authentication information database in association with one another. The identity confirmation document acquired by the authentication server 10 may be discarded after the end of the identity confirmation, or may be stored in association with the user ID or the like.

The system user can update the facial image registered in the system. For example, in a case where a long time has elapsed from the start of use of the system, the user may want to register the current face (facial image) in the system. In this case, the authentication server determines whether the facial image can be updated, and changes the registered facial image according to the result. A detailed description of whether the facial image can be updated will be given later.

In the first example embodiment, an example of using a user ID and a password as an identifier that uniquely defines a system user will be described. However, when there is no overlap between user IDs between users, a user ID can be used as the identifier.

Service Registration Phase

Figure 4:
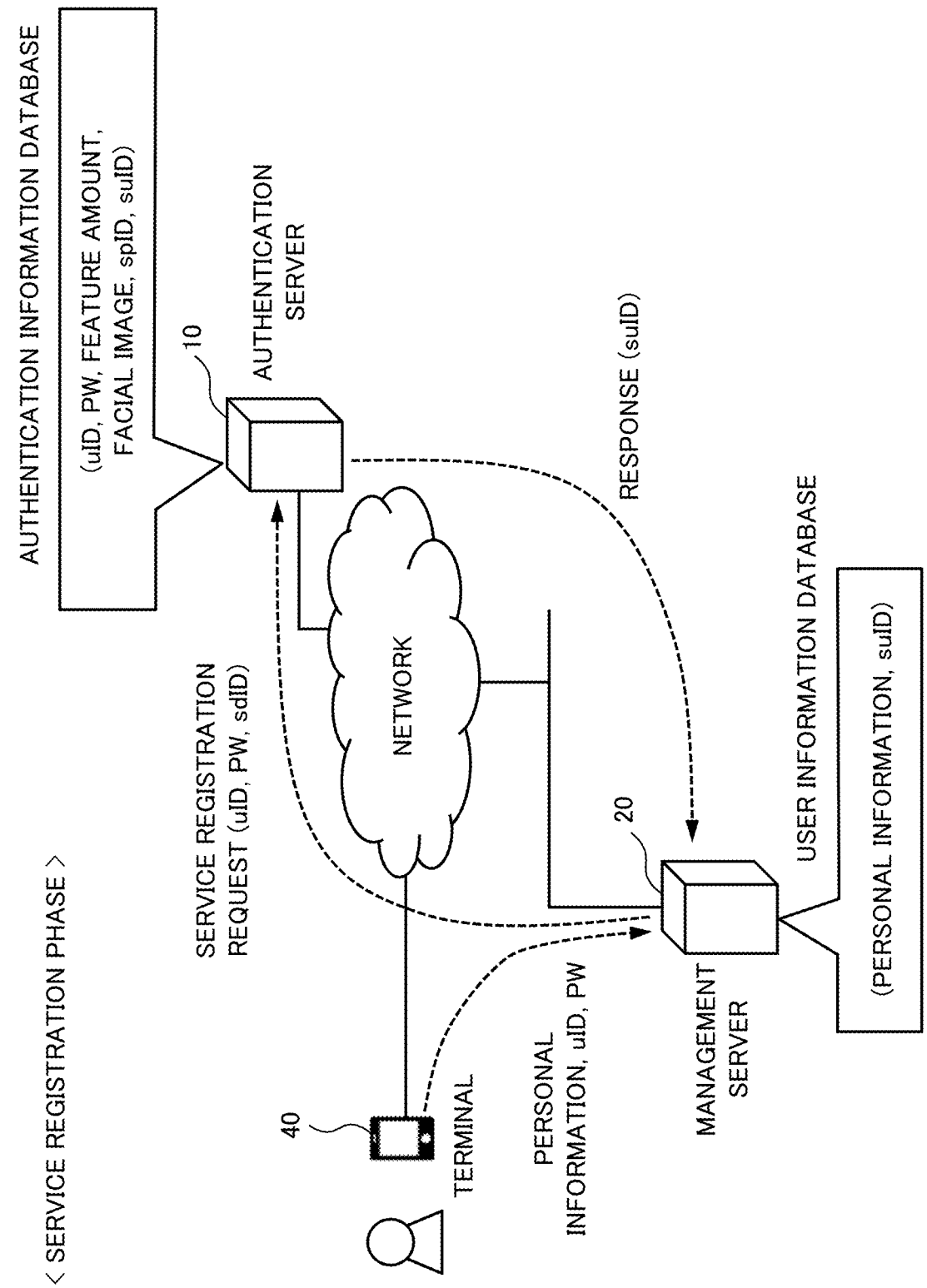
FIG. 4 is a diagram for describing an operation in a service registration phase of the authentication system according to the first example embodiment.

FIG. 4 is a diagram for describing an operation in a service registration phase of the authentication system according to the first example embodiment.

The user who has completed the user registration selects a service provider from whom the user wants to receive a service by biometric authentication, and registers the selected service provider in the system.

The user registers personal information (for example, name and the like) necessary for receiving a service from the selected service provider in the system. Examples of the personal information include name, age, gender, and the like. The user registers the user ID and the password determined in the user registration phase in the system together with the personal information.

In the disclosure of the present application, the personal information is defined as information that does not include biometric information of the user (person to be authenticated). That is, the biometric information and the feature amount generated from the biometric information are excluded from the "personal information" of the disclosure of the present application.

The user inputs the three pieces of information (personal information, user ID, password) to the service provider using any means. For example, as illustrated in FIG. 4, the user may operate the terminal 40 to input the three pieces of information to the management server 20.

Upon acquiring the three pieces of information (Personal information, user ID, password), the management server 20 transmits a "service registration request" to the authentication server 10. Specifically, the management server 20 transmits a service registration request including the service provider ID, the user ID, and the password to the authentication server 10.

The service provider ID is identification information for uniquely identifying a service provider (a retail store or the like participating in an authentication base using biometric authentication) included in the authentication system. In the example of FIG. 2, different service provider IDs are assigned to the respective service providers S1 and S2.

The service provider ID is an ID assigned to each service provider, and is not an ID assigned to each service. For example, in FIG. 2, even when the service providers S1 and S2 are business operators that provide the same type of service (for example, accommodation service), in a case where the management entities are different, different IDs are assigned to these service providers.

The authentication server 10 and the management server 20 share the service provider ID by an any method. For example, when the service provider participates in the authentication base, the authentication server 10 may generate a service provider ID and distribute (make notification of) the generated service provider ID to the service provider. In the drawings including FIG. 4, the service provider ID is denoted as an "spID".

When receiving the service registration request, the authentication server 10 searches the authentication information database using the user ID and the password included in the request as keys, and identifies the related user. Thereafter, the authentication server 10 generates a "service user ID".

The service user ID is identification information that uniquely defines a related relationship (combination) between the user and the service provider. In the example of FIG. 2, different values are set to a service user ID determined from the combination of the user U1 and the service provider S1 and a service user ID determined from the combination of the user U1 and the service provider S2.

The authentication server 10 stores a user ID, a password, a feature amount, a facial image, a service provider ID, and the generated service user ID in association with each other. In the drawings including FIG. 4, the service user ID is denoted as an "suID".

The authentication server 10 transmits the generated service user ID to the transmission source of the service registration request.

The management server 20 stores the service user ID acquired from the authentication server 10 and the personal information of the user in association with each other. The management server 20 adds a new entry to the user information database and stores the information (personal information, service user ID).

The user repeats the registration operation as described above for each service provider from whom the user wants to receive the provision of the service using the biometric authentication.

Service Providing Phase

Figure 5:
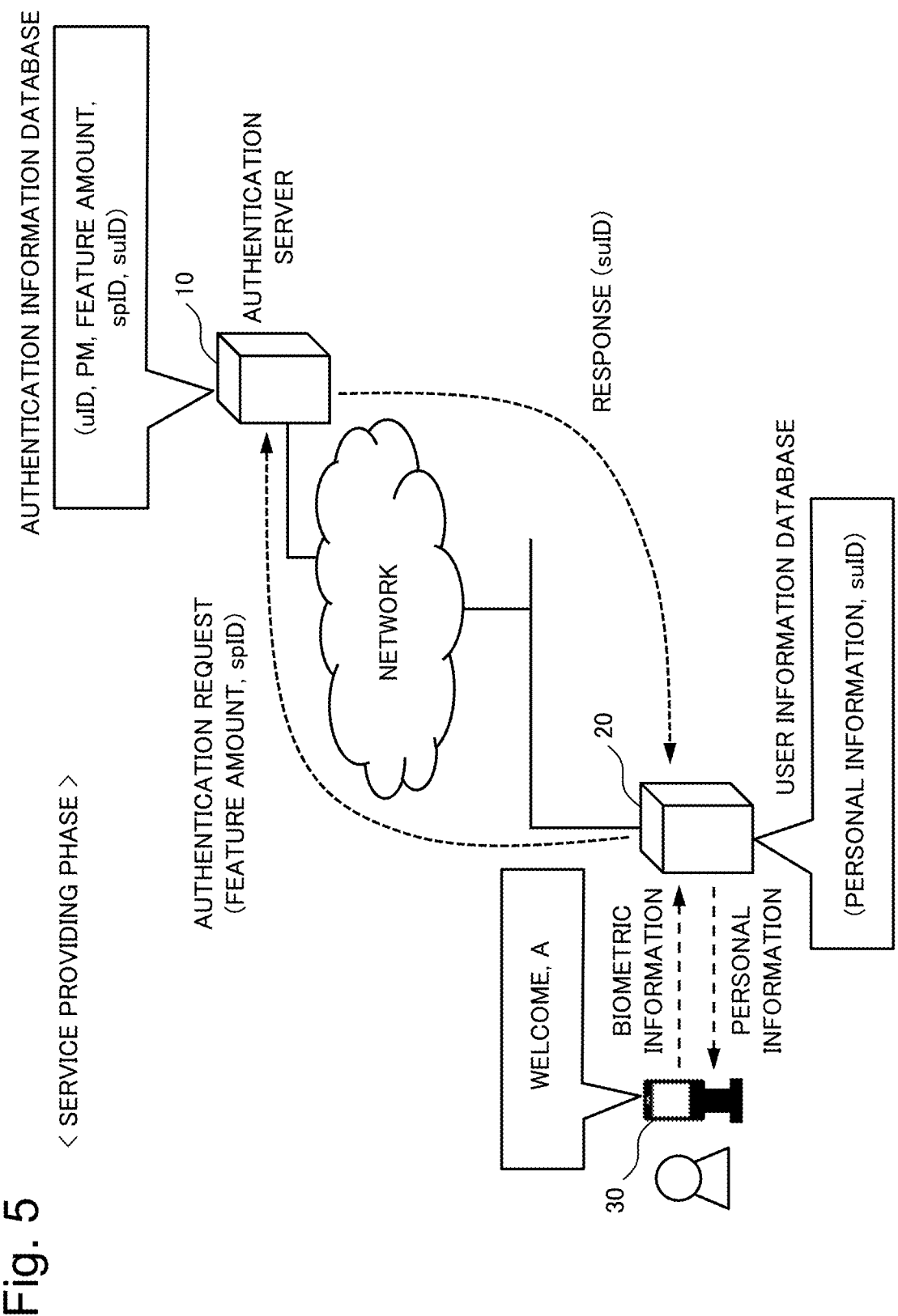
FIG. 5 is a diagram for describing an operation in a service providing phase of the authentication system according to the first example embodiment.

FIG. 5 is a diagram for describing an operation in a service providing phase of the authentication system according to the first example embodiment.

The user who has completed the service registration (service registration phase) visits the service provider. The user moves in front of an authentication terminal 30.

The authentication terminal 30 acquires the biometric information from the user in front of the terminal. Specifically, the authentication terminal 30 images the user and acquires a facial image. The authentication terminal 30 transmits the acquired facial image to the management server 20.

The management server 20 generates a feature amount from the acquired facial image. The management server 20 transmits an authentication request including the generated feature amount and the service provider ID to the authentication server 10.

The authentication server 10 extracts the feature amount from the authentication request, and executes collation a process (one-to-N collation, where N is a positive integer, and the same applies hereinafter) using the extracted feature amount and the feature amount registered in the authentication information database.

The authentication server 10 identifies the user by the collation process, and identifies the service user ID related to the service provider ID included in the authentication request among the plurality of service user IDs associated with the identified user.

The authentication server 10 transmits the identified service user ID to the transmission source of the authentication request. The authentication server 10 transmits a response (response to the authentication request) including the identified service user ID to the management server 20.

The management server 20 searches the user information database using the acquired service user ID as a key, and identifies personal information related to the service user ID.

The service provider (management server 20 and authentication terminal 30) provides the service (for example, payment, check in procedure, and the like) to the user based on the identified personal information.

Next, details of each device included in the authentication system according to the first example embodiment will be described.

Authentication Server

Figure 6:
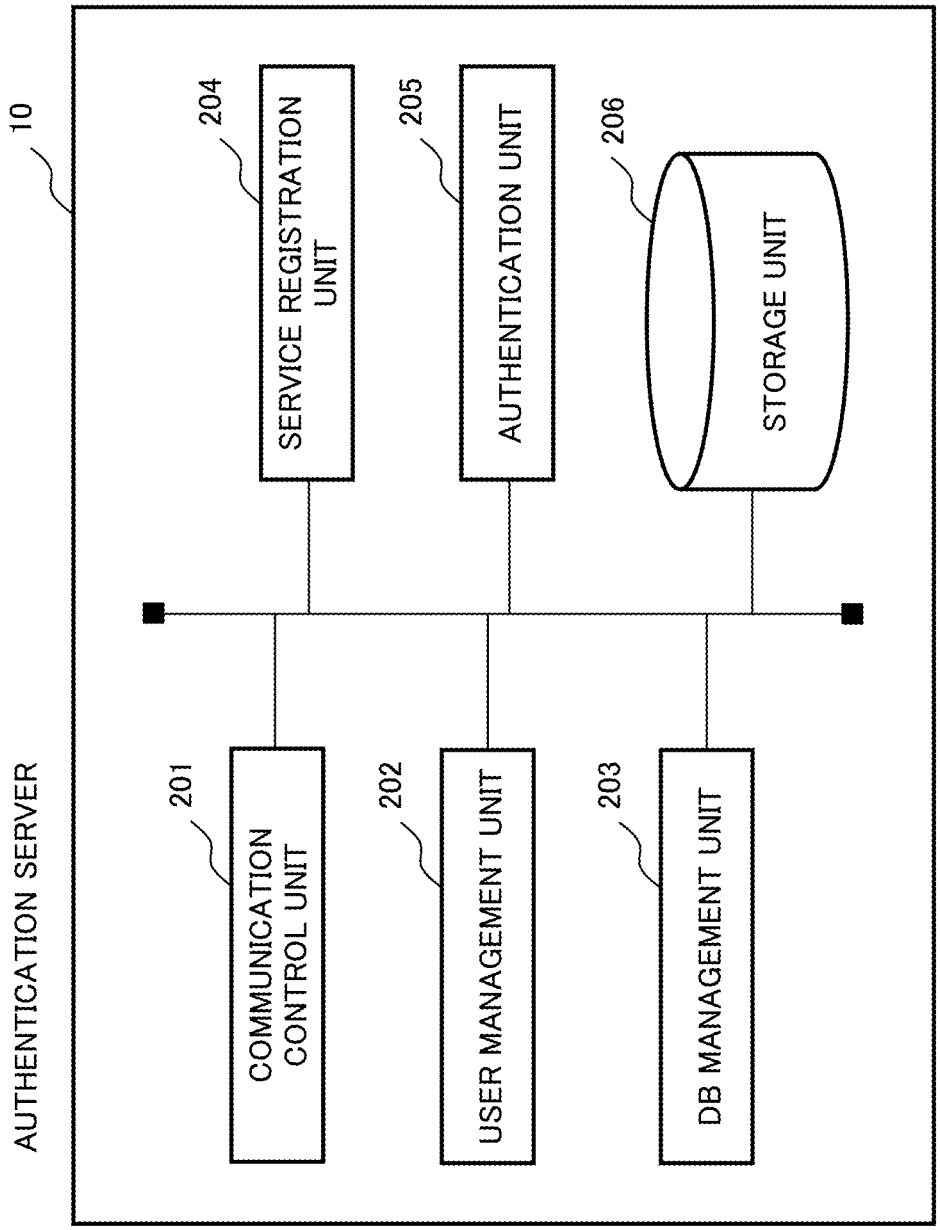
FIG. 6 is a diagram illustrating an example of a processing configuration of an authentication server according to the first example embodiment.

FIG. 6 is a diagram illustrating an example of a processing configuration (processing module) of the authentication server 10 according to the first example embodiment. Referring to FIG. 6, the authentication server 10 includes a communication control unit 201, a user management unit 202, a database management unit 203, a service registration unit 204, an authentication unit 205, and a storage unit 206.

The communication control unit 201 is a means that controls communication with other devices. For example, the communication control unit 201 receives data (packet) from the management server 20. The communication control unit 201 transmits data to the management server 20. The communication control unit 201 delivers data received from another device to another processing module. The communication control unit 201 transmits data acquired from another processing module to another device. In this manner, the other processing modules transmit and receive data to and from other devices via the communication control unit 201.

The user management unit 202 is a means that implements the user registration and the facial image update described above. The user management unit 202 has a function as a registration unit that registers the user and a function as an update unit that updates the registered facial image.

Figure 7:
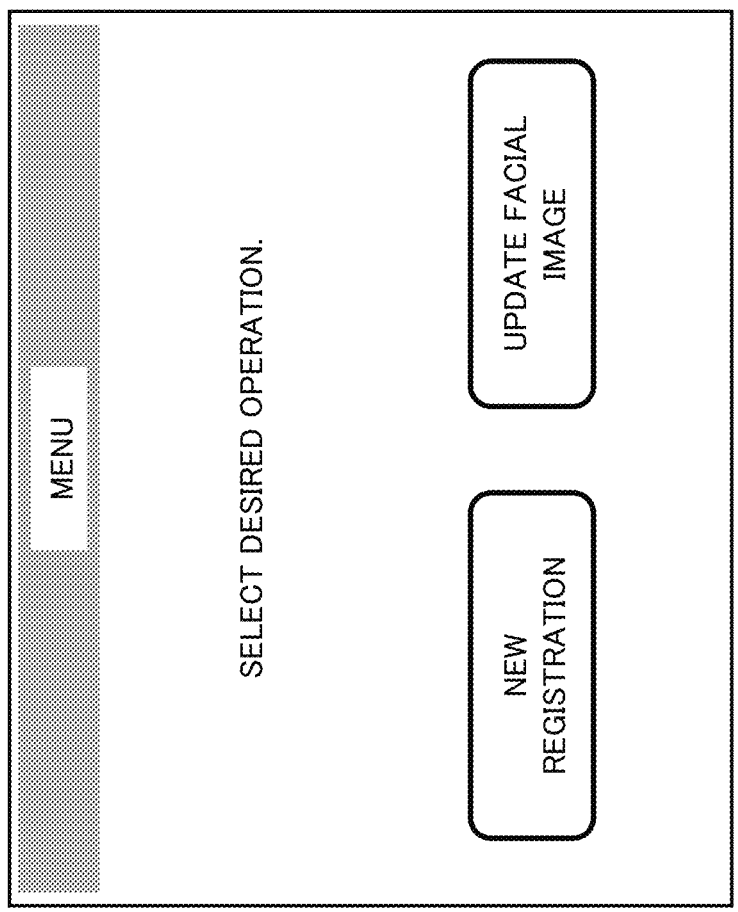
FIG. 7 is a diagram for explaining an operation of a user management unit of the authentication server according to the first example embodiment.

When the terminal 40 accesses the authentication server 10, the user management unit 202 displays a menu as illustrated in FIG. 7.

In a case where the user wants new registration, the user management unit 202 acquires a user ID of the user (a user who wants to receive a service using biometric authentication; system user), a password, biometric information (facial image), and an identity confirmation document.

Figure 8:
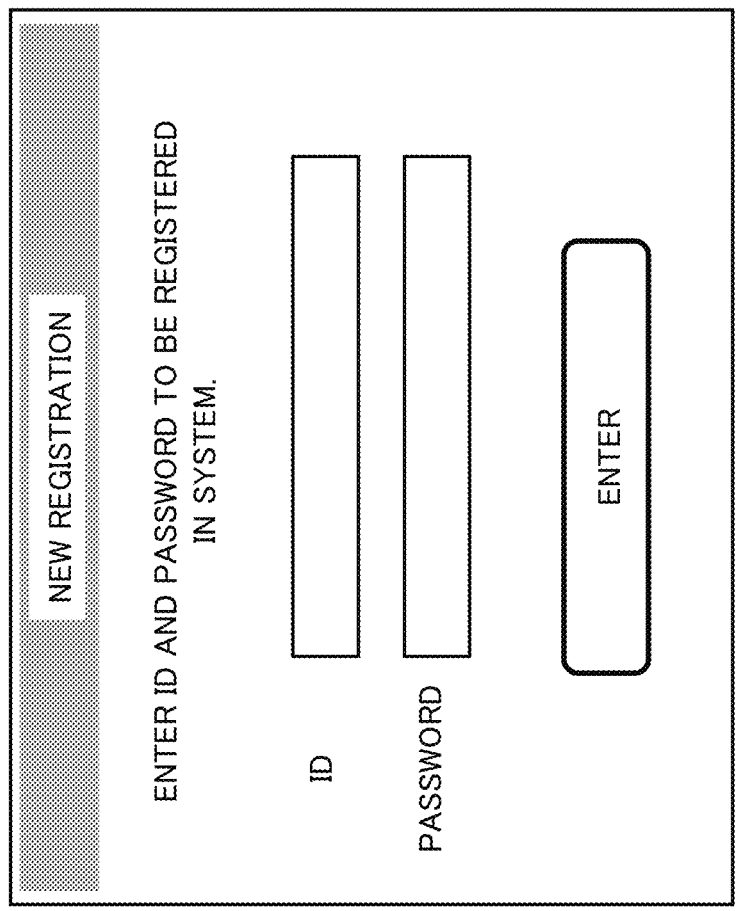
FIG. 8 is a diagram for explaining an operation of the user management unit of the authentication server according to the first example embodiment.

The user management unit 202 acquires the four pieces of information (user ID, password, biometric information, identity confirmation document) using an any means. For example, the user management unit 202 displays a graphical user interface (GUI) and an input form for determining a user ID and a password on the terminal 40. For example, the user management unit 202 displays a GUI as illustrated in FIG. 8 on the terminal 40.

The user management unit 202 verifies that the user ID and the password acquired by the GUI or the like do not overlap with the user ID and the password already registered. When the overlapping does not occur, the user management unit 202 displays a GUI for acquiring the biometric information and the identity confirmation document of the user on the terminal 40.

Figure 9:
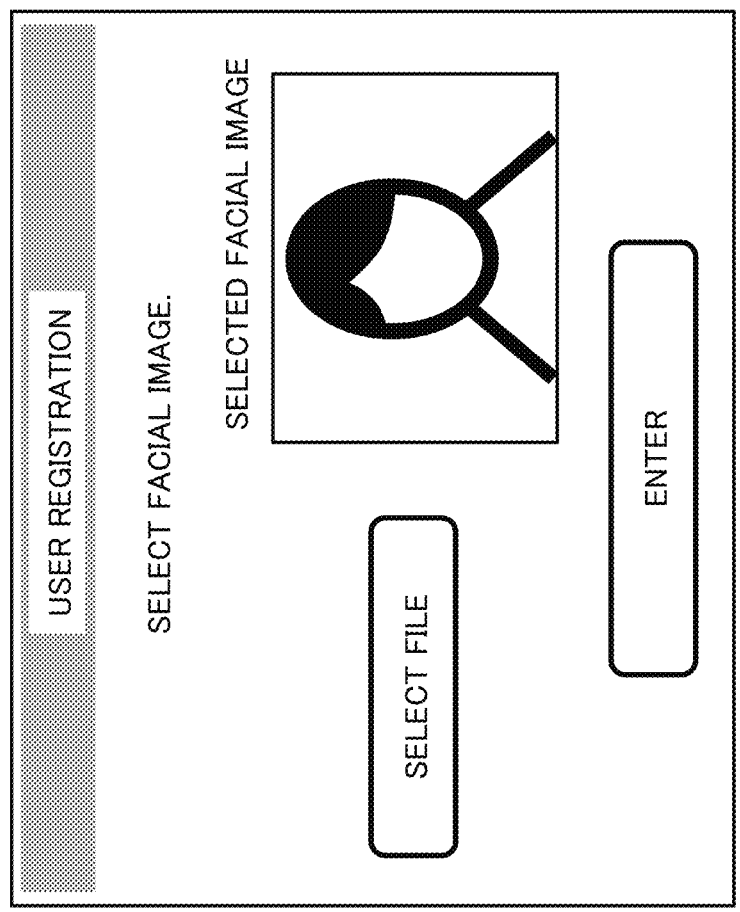
FIG. 9 is a diagram for explaining an operation of the user management unit of the authentication server according to the first example embodiment.

For example, the user management unit 202 displays a GUI as illustrated in FIG. 9 on the terminal 40. For example, the user presses a "file selection" button illustrated in FIG. 9 to designate image data of a facial image to be registered in the system. The designated facial image is displayed in the preview area (displayed as a selected facial image in FIG. 9). When registering the previewed facial image, the user presses the "enter" button.

Figure 10:
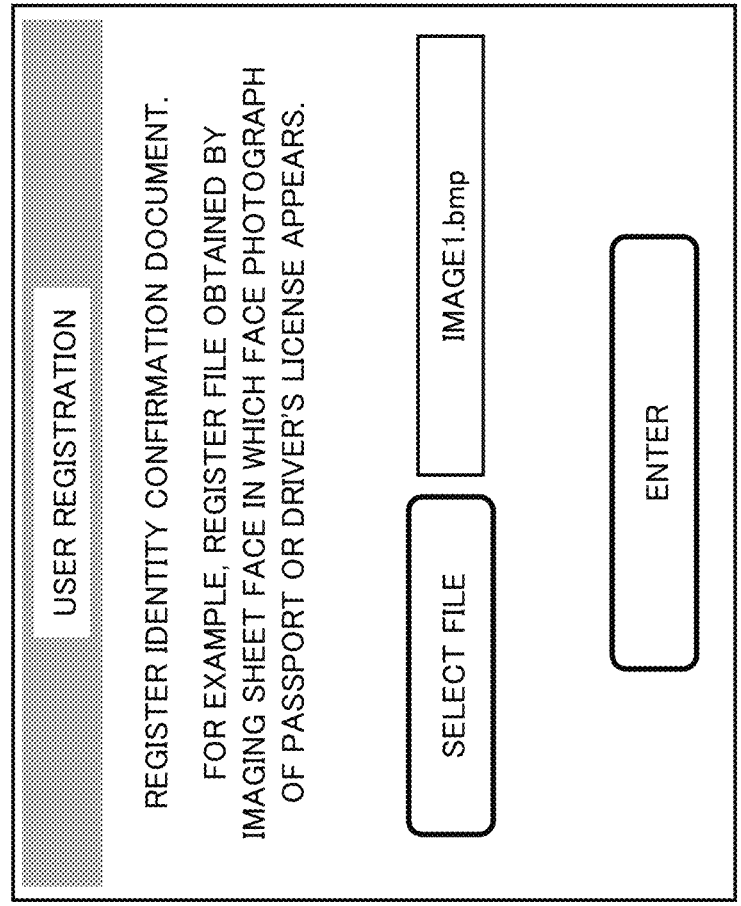
FIG. 10 is a diagram for explaining an operation of the user management unit of the authentication server according to the first example embodiment.

When the facial image is acquired, the user management unit 202 acquires an identity confirmation document. For example, the user management unit 202 displays a GUI as illustrated in FIG. 10 on the terminal 40. For example, the user captures an image of an identity confirmation document using the camera of the terminal 40. The user presses the "file selection" button to designate an image of the captured identity confirmation document. Thereafter, the user presses the "enter" button to register the identity confirmation document.

Examples of the identity confirmation document that is allowed to be registered in the system include a document (a document issued by a public institution and valid for identification) in which a facial image is described such as a passport or a driver's license. The identity confirmation document includes not only a document in the form of a paper medium but also a document in the form of an electronic medium.

For example, when acquiring the user ID, the password, the biometric information (facial image), and the identity confirmation document by the GUI as illustrated in FIGS. 8 to 10, the user management unit 202 confirms the identity of the user. Specifically, the user management unit 202 acquires a facial image for identity verification (hereinafter, referred to as a verification facial image) from the identity confirmation document. The user management unit 202 extracts the verification facial image from a predetermined region of the identity confirmation document using a technology such as template matching.

At the time of identity confirmation, the user management unit 202 generates a feature amount (a feature vector including a plurality of feature amounts) from each of the acquired facial image and verification facial image. An existing technique can be used for the feature point extraction processing, and thus a detailed description thereof will be omitted. For example, the user management unit 202 extracts eyes, a nose, a mouth, and the like as feature points from the facial image. Thereafter, the user management unit 202 calculates the position of each feature point and the distance between the feature points as feature amounts, and generates a feature vector (vector information characterizing the facial image) including a plurality of feature amounts.

Next, the user management unit 202 calculates similarity between the two images. A chi-square distance, a Euclidean distance, or the like can be used as similarity. The similarity is lower as the distance is longer, and similarity is higher as the distance is shorter. The user management unit 202 executes the threshold value process on similarity, and determines success or failure of identity confirmation according to the result.

When similarity is higher than a threshold value TH1, the user management unit 202 determines that the identity confirmation has succeeded. On the other hand, when similarity is equal to or less than the threshold value TH1, the user management unit 202 determines that the identity confirmation has failed. In this case, the user management unit 202 takes a measure such as prompting the user to register a high-quality facial image. As described above, when the identity confirmation is completed, the user management unit 202 may discard the identity confirmation document.

When the identity confirmation is successful, the user management unit 202 delivers the user ID, the password, the facial image, and the feature amount generated from the facial image to the database management unit 203. In the following description, the facial image registered in the authentication information database is referred to as a "registered facial image".

Figure 11:
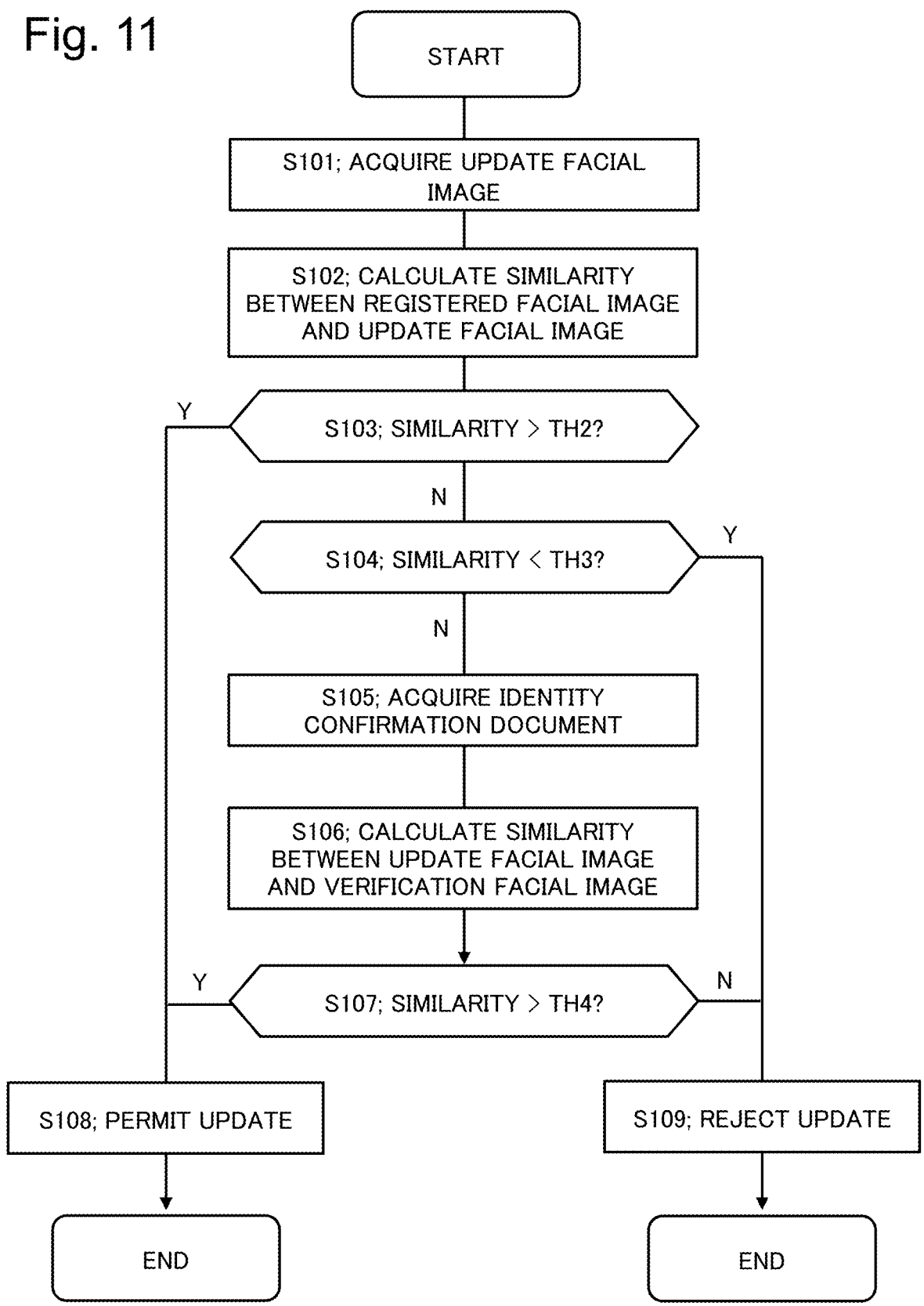
FIG. 11 is a flowchart illustrating an example of an operation related to a facial image update of the user management unit according to the first example embodiment.

Next, an operation of the user management unit 202 in a case where the facial image (registered facial image) is updated will be described. FIG. 11 is a flowchart illustrating an example of the operation related to the facial image update of the user management unit 202 according to the first example embodiment.

The user who wants to update the facial image accesses the authentication server 10 using the terminal 40. The user management unit 202 displays a menu screen as illustrated in FIG. 7 on the terminal 40. The user who wants to update the facial image presses the "update facial image" button.

Figure 12:
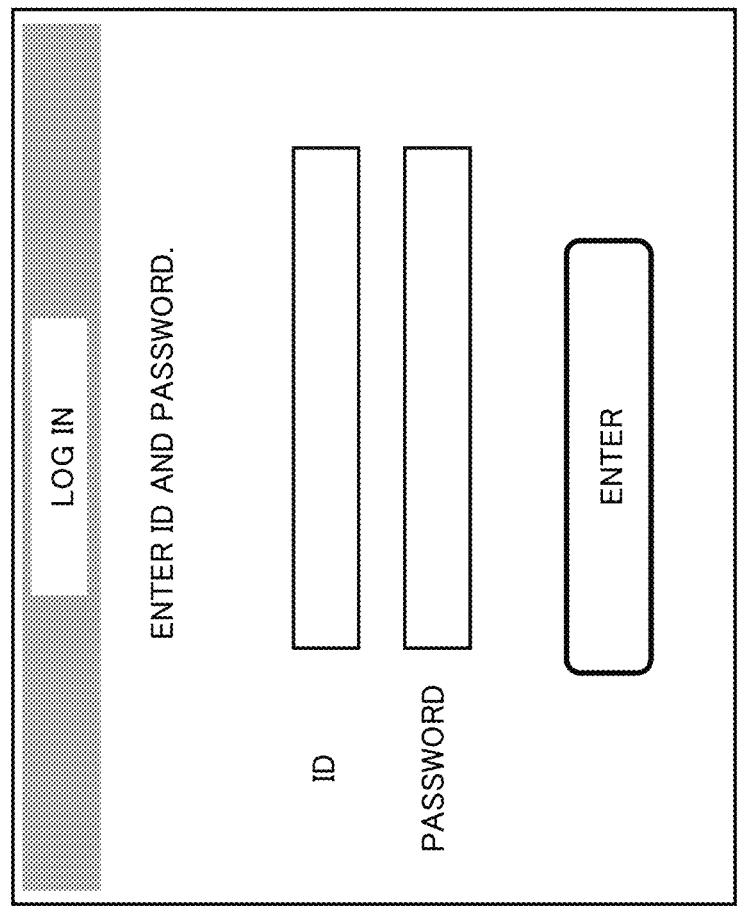
FIG. 12 is a diagram for explaining an operation of the user management unit of the authentication server according to the first example embodiment.

When the "update facial image" button is pressed, the user management unit 202 displays a GUI for the user to log in to the system. For example, the user management unit 202 performs display as illustrated in FIG. 12 to acquire a user ID and a password.

The user management unit 202 searches the authentication information database using the user ID and the password acquired as keys, determines that the user is a user registered in the system when there is a related entry, and advances the facial image update process. In this case, the user management unit 202 reads the registered facial image from the related entry. On the other hand, when the entry does not exist, the user management unit 202 determines that the user fails to log in to the system. In this case, the user management unit 202 notifies the user of the fact. The user management unit 202 may perform display such that the user can check the read facial image (registered facial image) at the timing when the facial image is read from the authentication information database.

Figure 13:
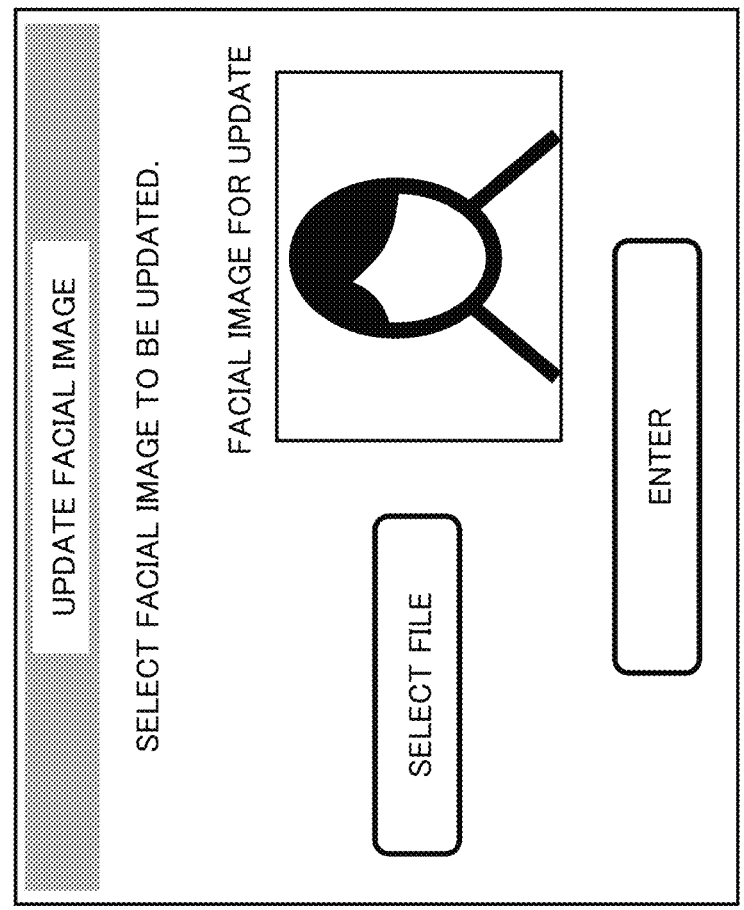
FIG. 13 is a diagram for explaining an operation of the user management unit of the authentication server according to the first example embodiment.

After the login by the user registered in the system, the user management unit 202 acquires a facial image for update (hereinafter, referred to as an update facial image) (step S101 in FIG. 11). For example, the user management unit 202 performs display as illustrated in FIG. 13 in order to acquire the update facial image. The user selects the update facial image and presses the "enter" button.

The user management unit 202 determines whether the registered facial image may be updated using the acquired update facial image.

The user management unit 202 calculates similarity between the registered facial image and the update facial image (step S102). The user management unit 202 performs the threshold value process on the calculated similarity, and determines whether to update the registered facial image according to the result.

Figure 14:
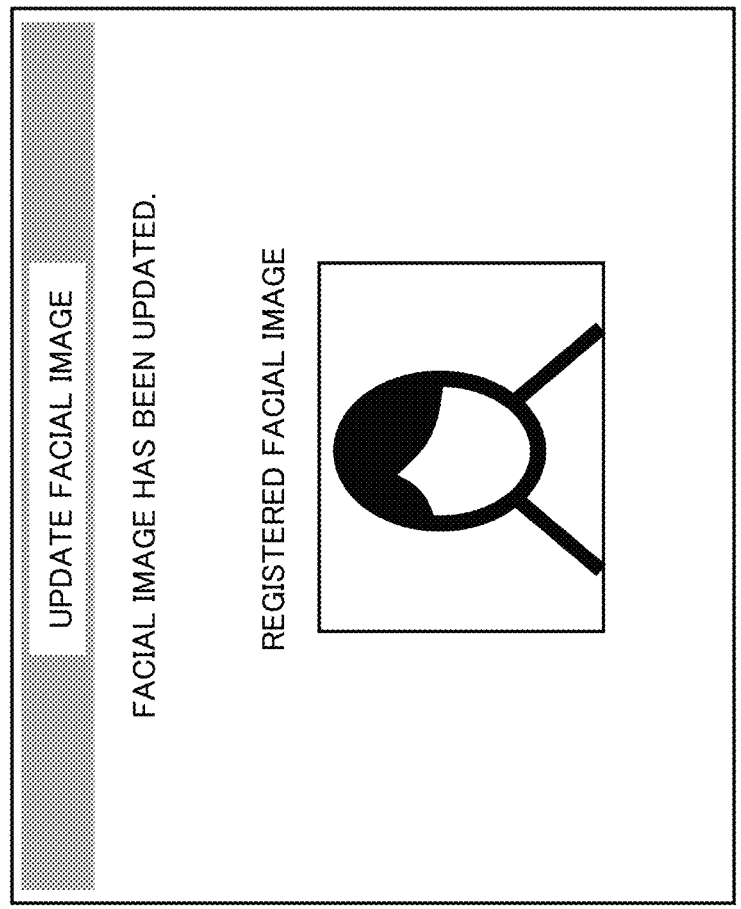
FIG. 14 is a diagram for explaining an operation of the user management unit of the authentication server according to the first example embodiment.

When similarity is greater than a threshold value TH2 (step S103: Yes branch), the user management unit 202 permits update of the registered facial image (step S108). Since the two facial images having high similarity can be determined to be facial images acquired from substantially the same person, the user management unit 202 permits update of the registered facial image. In this case, the user management unit 202 performs display as illustrated in FIG. 14 and notifies the user that the registered facial image has been updated.

Figure 15:
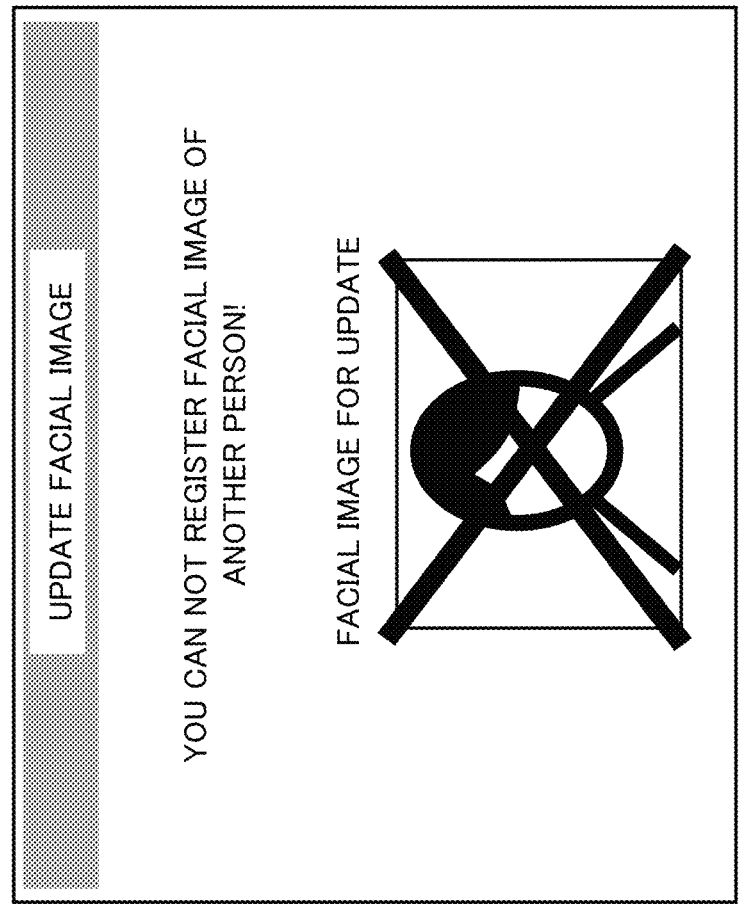
FIG. 15 is a diagram for explaining an operation of the user management unit of the authentication server according to the first example embodiment.

When similarity is less than the threshold value TH3 (step S104: Yes branch), the user management unit 202 rejects the update of the registered facial image. Since the two facial images having low similarity can be determined to be facial images of different persons, the user management unit 202 rejects the update of the registered facial image (step S109). In this case, since unauthorized use of the system or the like is also suspected, the user management unit 202 performs display as illustrated in FIG. 15.

Figure 16:
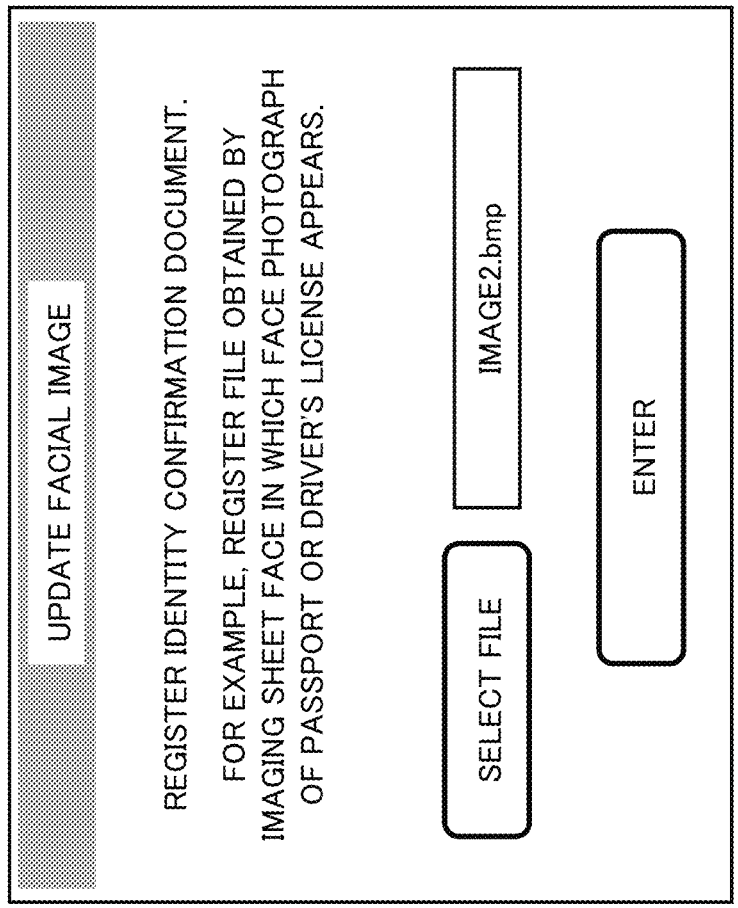
FIG. 16 is a diagram for explaining an operation of the user management unit of the authentication server according to the first example embodiment.

In a case where similarity is equal to or greater than the threshold value TH3 and equal to or less than the threshold value TH2 (step S103: No branch; step S104: No branch), the user management unit 202 acquires an identity confirmation document (step S105). For example, the user management unit 202 acquires an identity confirmation document using a GUI as illustrated in FIG. 16. The user management unit 202 extracts the verification facial image from the identity confirmation document.

In a case where the identity confirmation document is not discarded at the time of system registration of the user and is stored in the database, the user management unit 202 may omit execution of step S105 and use the identity confirmation document stored in the database.

Alternatively, the user management unit 202 may take a measure such as rejecting the reception of an old identity confirmation document (an identity confirmation document issued before a predetermined period before the update date of the facial image) based on the expiration date, the issuance date, and the like of the acquired identity confirmation document. That is, the user management unit 202 may select an identity confirmation document from which the update facial image is extracted based on the description (for example, the date and the period described in the document) of the identity confirmation document. That is, the user management unit 202 may determine whether to extract the verification facial image based on the description of the identity confirmation document. The user management unit 202 may acquire the verification facial image reflecting the current appearance and the like of the user by performing such selection and determination.

The user management unit 202 calculates similarity between the update facial image and the verification facial image (step S106). The user management unit 202 executes a threshold value process on the calculated similarity, and determines whether to update the registered image according to the result.

When similarity is higher than a threshold value TH4 (step S107: Yes branch), the user management unit 202 permits update of the registered facial image (step S108). In this case, the user management unit 202 performs display as illustrated in FIG. 14.

On the other hand, when similarity is equal to or less than the threshold value TH4 (step S107: No branch), the user management unit 202 rejects the update of the registered facial image to the update facial image (step S109). In this case, the user management unit 202 performs display as illustrated in FIG. 15.

Figure 17:
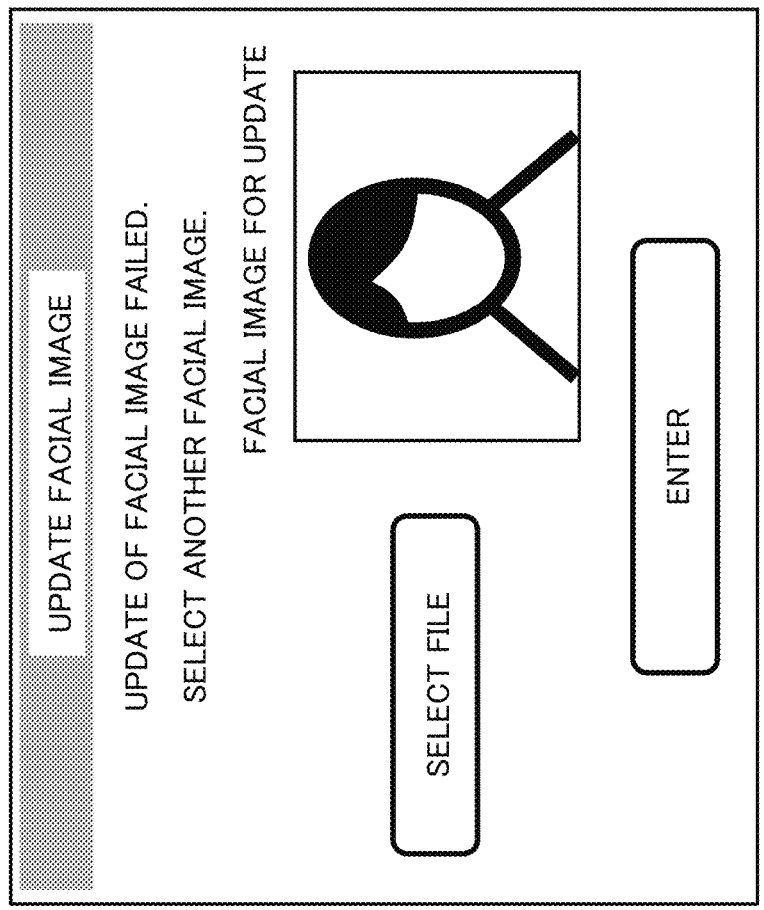
FIG. 17 is a diagram for explaining an operation of the user management unit of the authentication server according to the first example embodiment.

Alternatively, the user management unit 202 may display as illustrated in FIG. 17 to prompt the user to reinput the update facial image. The user management unit 202 may repeat the determination process described above using the reinput facial image.

In a case where the update of the registered facial image is permitted, the user management unit 202 generates the feature amount from the update facial image. The user management unit 202 delivers the user ID, the password, the generated feature amount, and the update facial image to the database management unit 203, and instructs the database management unit 203 to update the biometric information (feature amount and facial image).

In this manner, the user management unit 202 functioning as a facial image update unit determines whether to update the registered facial image to the update facial image according to similarity between the registered facial image (first facial image) and the update facial image (second facial image). The user management unit 202 updates the registered facial image in a case where similarity between the registered facial image and the update facial image is greater than a first threshold value (threshold value TH2). In a case where similarity between the registered facial image and the update facial image is less than the second threshold value (threshold value TH3), the user management unit 202 does not update the registered facial image.

In a case where the degree of similarity between the registered facial image and the update facial image is equal to or greater than the second threshold value and equal to or less than the first threshold value, the user management unit 202 acquires an identity confirmation document of the user. The user management unit 202 extracts the verification facial image (third facial image) from the identity confirmation document, and determines whether to update the registered facial image according to similarity between the update facial image and the verification facial image. In a case where similarity between the update facial image and the verification facial image is greater than the third threshold value (threshold value TH4), the user management unit 202 updates the registered facial image. The user management unit 202 does not update the registered facial image in a case where similarity between the update facial image and the verification facial image is equal to or less than the third threshold value.

The database management unit 203 is a means that manages the authentication information database. The authentication information database stores information for identifying a system user (user ID, password), biometric information of the user (feature amount and facial image), a service provider ID for identifying a service provider, and a service user ID for identifying a user in each service in association with each other. The authentication information database is a database that stores at least a registered facial image (first facial image) of the user.

In a case where acquiring the four pieces of information (user ID, password, feature amount, and facial image) from the user management unit 202, the database management unit 203 adds a new entry to the authentication information database. For example, in a case where the above-described four pieces of information about the user U1 are acquired, the database management unit 203 adds an entry illustrated in the lowermost stage of FIG. 18. Since the service provider ID and the service user ID are not generated at the stage of user registration, nothing is set in the field.

In a case where four pieces of information (user ID, password, feature amount, and facial image) accompanied by an instruction to update the facial image are acquired from the user management unit 202, the database management unit 203 updates (overwrites) the feature amount and the facial image of the related entry.

The service registration unit 204 is a means that implements individual service registration by the system user. The service registration unit 204 processes a service registration request acquired from the management server 20 of the service provider.

The service registration unit 204 searches the authentication information database using the user ID and the password included in the acquired service registration request as keys. The service registration unit 204 checks a service provider ID field of the identified user (user identified from a set of user ID and password).

The service registration unit 204 determines whether the service provider ID included in the service registration request acquired from the management server 20 is set in the service provider ID field. When the service provider ID acquired from the management server 20 has already been registered in the database, the service registration unit 204 notifies the management server 20 of the fact. In this case, since the service (service provider) to be registered by the user is already registered in the authentication information database, the service registration unit 204 transmits a "negative response" as a response to the service registration request.

On the other hand, when the service provider ID included in the service registration request is not set in the service provider ID field of the identified user, the service registration unit 204 generates the service user ID related to the user and the service provider.

As described above, the service user ID is identification information uniquely determined from a combination of a user and a service provider. For example, the service registration unit 204 calculates a hash value using the user ID, the password, and the service provider ID, and sets the calculated hash value as the service user ID. Specifically, the service registration unit 204 calculates a concatenated value of the user ID, the password, and the service provider ID, and calculates the hash value of the calculated concatenated value to generate the service user ID.

The generation of the service user ID using the hash value is an example and is not intended to limit the method of generating the service user ID. The service user ID may be any information as long as the information can uniquely identify the combination of the system user and the service provider. For example, the service registration unit 204 may assign a unique value each time the service registration request is processed to obtain the service user ID.

When the service user ID is generated, the service registration unit 204 delivers the service provider ID and the service user ID together with the user ID and the password to the database management unit 203. The database management unit 203 registers two IDs (service provider ID, service user ID) in the authentication information database. For example, when the user U1 performs service registration for the service provider S1, the two IDs are added to the entry illustrated at the bottom of FIG. 19.

Since service registration is performed for each service provider, a plurality of service providers and service user IDs may be set for one user. For example, in a case where the user U1 performs service registration for each of the service providers S1 and S2, the entries of the second and third lines of FIG. 20 are generated. In a case where the user U2 performs service registration for the service provider S1, the entry at the bottom of FIG. 20 is generated.

When the service provider ID and the service user ID are registered in the authentication information database, the service registration unit 204 notifies the management server 20 that the service registration request is normally processed. The service registration unit 204 transmits a "positive response" as a response to the service registration request. At this time, the service registration unit 204 transmits a response including the service user ID to the management server 20.

The authentication unit 205 is a means that performs an authentication process of the system user. The authentication unit 205 processes an authentication request received from the management server 20 of the service provider.

The authentication unit 205 extracts the feature amount and the service provider ID included in the authentication request. The authentication unit 205 searches the authentication information database using the extracted feature amount and the extracted service provider ID as keys, and identifies the related service user ID.

The authentication unit 205 sets the feature amount extracted from the authentication request as the feature amount on the collation side and the feature amount stored in the database as the feature amount on the registration side, and executes the one-to-N collation.

The authentication unit 205 determines whether there is a feature amount having similarity with the feature amount to be collated equal to or greater than a predetermined value and having the highest similarity among the plurality of feature amounts registered in the database. In a case where such a feature amount exists, the authentication unit 205 determines whether there is an entry matching a service provider ID included in the authentication request among at least one or more service provider IDs associated with the user identified by the one-to-N collation.

In a case where the entry as described above exists (in a case where the above two determinations are successful), the authentication unit 205 determines that the authentication of the user is successful. In this case, the authentication unit 205 transmits a "positive response" to the management server 20 that is a transmission source of the authentication request. At this time, the authentication unit 205 generates a response (response to the authentication request) including the service user ID of the identified entry to transmit the response to the management server 20.

In a case where at least one of the two determinations fails, the authentication unit 205 determines that the authentication of the user fails. In this case, the authentication unit 205 transmits a "negative response" to the management server 20 that is a transmission source of the authentication request.

For example, in the example of FIG. 20, in a case where the feature amount of "FV1" and the service provider ID of "S1" are included in the authentication request, the entries (users) of the second and third lines are identified by the feature amount FV1, and the entry of the second line is identified by the service provider ID "S1". As a result, the authentication request is normally processed, and the positive response including the service user ID of "U1S1" is transmitted to the management server 20.

The storage unit 206 stores information necessary for the operation of the authentication server 10. In the storage unit 206, an authentication information database is constructed.

Management Server

Figure 21:
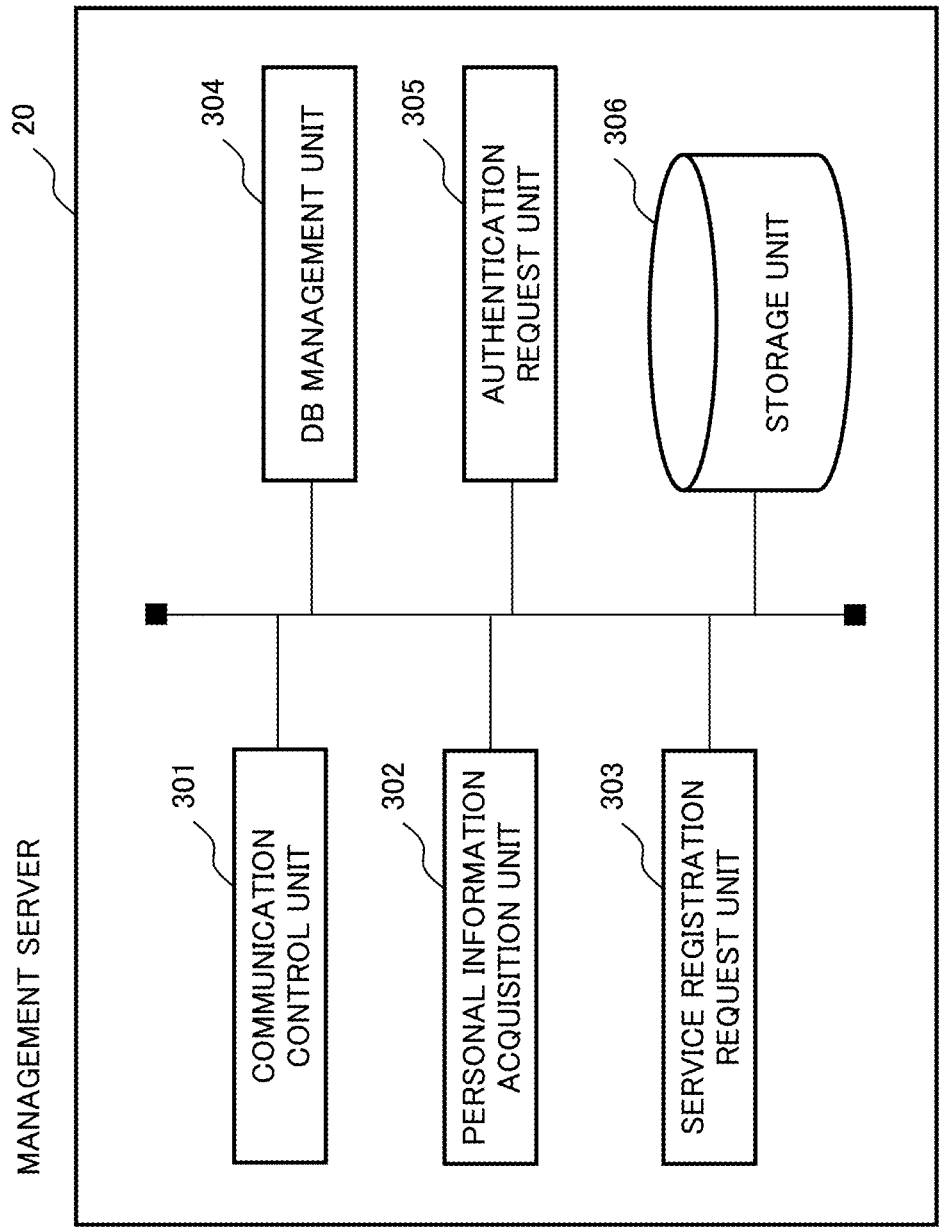
FIG. 21 is a diagram illustrating an example of a processing configuration of a management server according to the first example embodiment.

FIG. 21 is a diagram illustrating an example of a processing configuration (processing module) of the management server 20 according to the first example embodiment. Referring to FIG. 21, the management server 20 includes a communication control unit 301, a personal information acquisition unit 302, a service registration request unit 303, a database management unit 304, an authentication request unit 305, and a storage unit 306.

The communication control unit 301 is a means that controls communication with other devices. For example, the communication control unit 301 receives data (packet) from the authentication server 10 and the authentication terminal 30. The communication control unit 301 transmits data to the authentication server 10 and the authentication terminal 30. The communication control unit 301 delivers data received from another device to another processing module. The communication control unit 301 transmits data acquired from another processing module to another device.

In this manner, the other processing modules transmit and receive data to and from other devices via the communication control unit 301.

The personal information acquisition unit 302 is a means that acquires personal information required when a service provider provides a service. For example, in a case where the service provider is a "retail store", the personal information acquisition unit 302 acquires information about payment settlement (for example, credit card information and bank account information.) in addition to the user's name and the like. Alternatively, in a case where the service provider is a "hotel business operator", the personal information acquisition unit 302 acquires reservation information about accommodation (for example, the date of staying, and the like) in addition to a name and the like.

In addition to the personal information such as the name, the personal information acquisition unit 302 acquires a user ID and a password determined by the user at the time of system registration.

The personal information acquisition unit 302 acquires the personal information, the user ID, and the password using any means. For example, the personal information acquisition unit 302 displays a GUI or a form for inputting the above information on the terminal 40 (see FIG. 22). Alternatively, information as illustrated in FIG. 22 may be displayed on a web page managed and operated by the service provider. Alternatively, the terminal 40 may download an application provided by the service provider, and display as illustrated in FIG. 22 may be performed by the application. Specifically, the web page may be a web page that manages member information of a service provider. That is, a member of each service provider may perform service registration on a web page that manages his/her member information.

The personal information acquisition unit 302 delivers the personal information, the user ID, and the password acquired using the GUI or the like to the service registration request unit 303.

The service registration request unit 303 is a means that requests that the authentication server 10 register the service use of the user.

The service registration request unit 303 selects a user ID and a password from the three pieces of information (personal information, user ID, password) acquired from the personal information acquisition unit 302. The service registration request unit 303 transmits a service registration request including the selected user ID and password, and service provider ID to the authentication server 10.

The service registration request unit 303 acquires a response to the service registration request from the authentication server 10. In a case where the acquired response is a "negative response", the service registration request unit 303 notifies the user of the fact. For example, the service registration request unit 303 notifies the user that service registration has already been performed.

In a case where the acquired response is a "positive response", the service registration request unit 303 notifies the user that the service registration is successful. The service registration request unit 303 delivers the service user ID included in the response and the personal information acquired from the personal information acquisition unit 302 to the database management unit 304.

The database management unit 304 is a means that manages the user information database. The user information database is a database that manages information on users (system users) who are to be offered a service. The user information database stores personal information (for example, name and the like) of the user and the service user ID acquired from the authentication server 10 in association with each other.

When acquiring the information (personal information, service user ID) from the service registration request unit 303, the database management unit 304 adds a new entry to the user information database. For example, in a case where the management server 20 of the service provider S1 acquires the information about the user U1, an entry illustrated at the bottom of FIG. 23 is added.

The authentication request unit 305 is a means that requests that the authentication server 10 authenticate the user.

When acquiring the biometric information (facial image) from the authentication terminal 30, the authentication request unit 305 generates a feature amount from the facial image. The authentication request unit 305 transmits an authentication request including the generated feature amount and the service provider ID to the authentication server 10.

In a case where the response from the authentication server 10 is a "negative response" (in a case of unsuccessful authentication), the authentication request unit 305 notifies the authentication terminal 30 of the fact.

In a case where the response from the authentication server 10 is a "positive response" (in a case of successful authentication), the authentication request unit 305 extracts the service user ID included in the response from the authentication server 10. The authentication request unit 305 searches the user information database using the service user ID as a key, and identifies a related entry.

The authentication request unit 305 reads the personal information set in the personal information field of the identified entry to transmit the personal information to the authentication terminal 30. For example, in the example of FIG. 23, when the service user ID is "U1S1", the personal information at the bottom is transmitted to the authentication terminal 30.

The storage unit 306 stores information necessary for the operation of the management server 20. The user information database is constructed in the storage unit 306.

Authentication Terminal

The authentication terminal 30 acquires the personal information of the user from the management server 20 by transmitting the biometric information acquired from the user to the management server 20. The authentication terminal 30 provides a service to the user using the acquired personal information.

Figure 24:
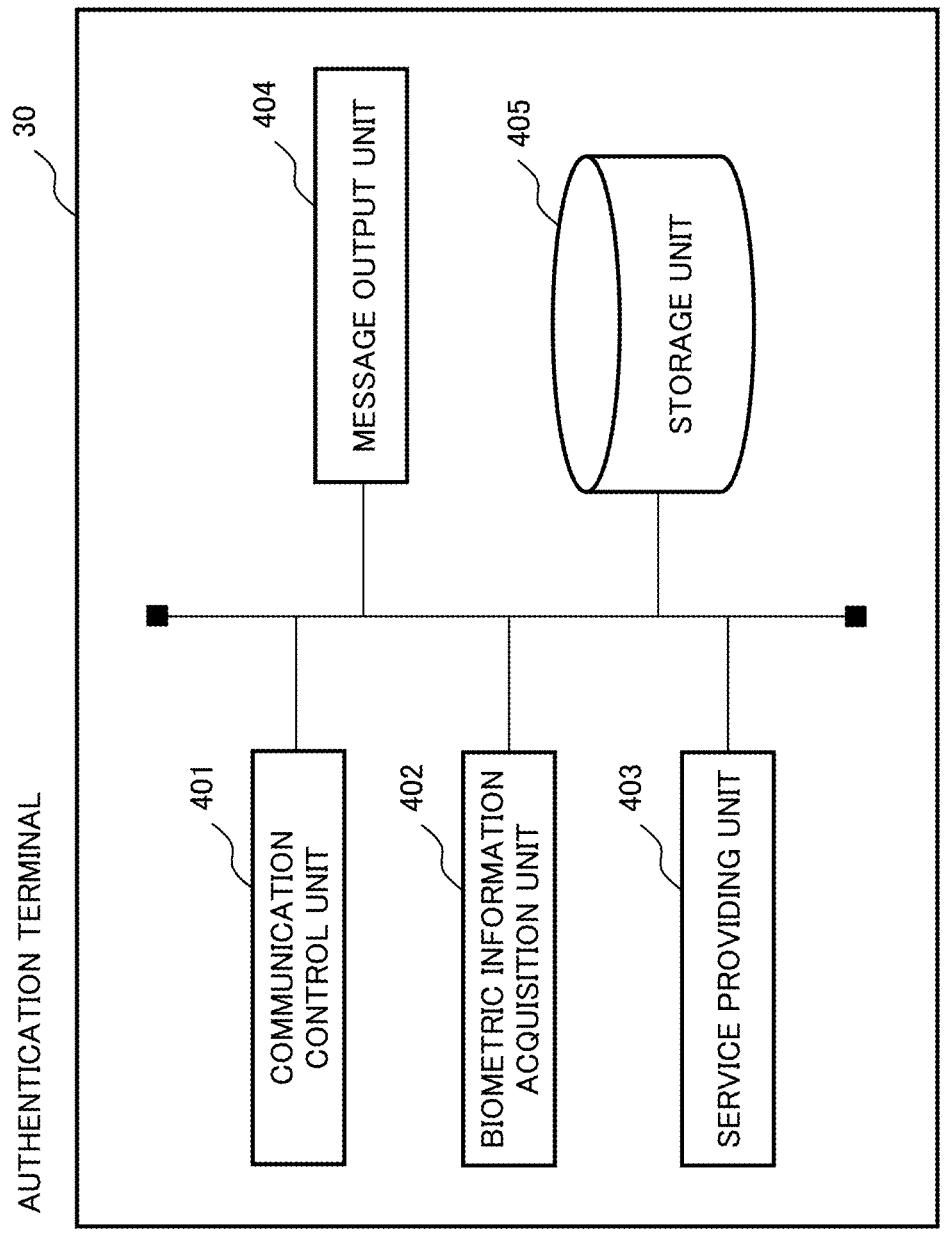
FIG. 24 is a diagram illustrating an example of a processing configuration of the authentication terminal according to the first example embodiment.

FIG. 24 is a diagram illustrating an example of a processing configuration (processing module) of the authentication terminal 30 according to the first example embodiment. Referring to FIG. 24, the authentication terminal 30 includes a communication control unit 401, a biometric information acquisition unit 402, a service providing unit 403, a message output unit 404, and a storage unit 405.

The communication control unit 401 is a means that controls communication with other devices. For example, the communication control unit 401 receives data (packet) from the management server 20. The communication control unit 401 transmits data to the management server 20. The communication control unit 401 delivers data received from another device to another processing module. The communication control unit 401 transmits data acquired from another processing module to another device. In this manner, the other processing modules transmit and receive data to and from other devices via the communication control unit 401.

The biometric information acquisition unit 402 is a means that controls the camera and acquires the biometric information (facial image) of the user. The biometric information acquisition unit 402 captures an image ahead of the aircraft the biometric information acquisition unit 402 periodically or at predetermined timing. The biometric information acquisition unit 402 determines whether a facial image of a person is included in the acquired image, and extracts the facial image from the acquired image data in a case where the facial image is included.

Since an existing technology can be used for the facial image detection processing and the facial image extraction processing by the biometric information acquisition unit 402, detailed description thereof will be omitted. For example, the biometric information acquisition unit 402 may extract a facial image (face region) from the image data by using a learning model learned by a convolutional neural network (CNN). Alternatively, the biometric information acquisition unit 402 may extract the facial image using a method such as template matching.

The biometric information acquisition unit 402 delivers the extracted facial image to the service providing unit 403.

The service providing unit 403 is a means that provides a predetermined service to a user. The service providing unit 403 transmits the facial image acquired from the biometric information acquisition unit 402 to the management server 20. The management server 20 returns personal information (for example, name and the like) related to the facial image. The service providing unit 403 provides a service to the user using the returned personal information.

The message output unit 404 is a means that outputs various messages to the user. For example, the message output unit 404 outputs a message regarding an authentication result of the user or a message regarding service provision. The message output unit 404 may display a message using a display device such as a liquid crystal monitor, or may replay a voice message using an acoustic device such as a speaker.

The storage unit 405 stores information necessary for the operation of the authentication terminal 30.

Operation of System

Next, an operation of the authentication system according to the first example embodiment will be described. The operation will be described with respect to the service registration phase and the service providing phase, and the description of the user registration phase will be omitted.

Figure 25:
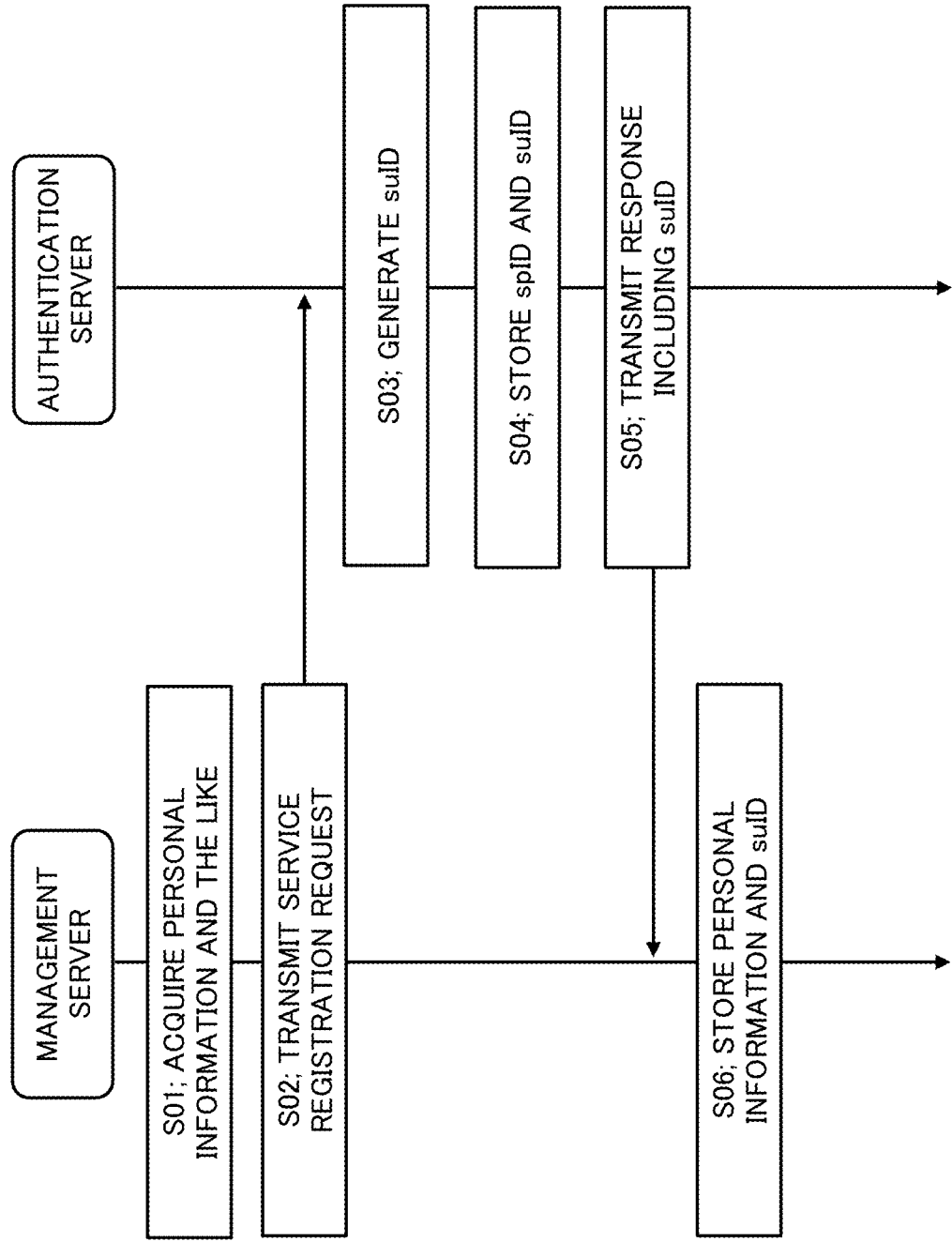
FIG. 25 is a sequence diagram illustrating an example of an operation related to a service registration phase of the authentication system according to the first example embodiment.

FIG. 25 is a sequence diagram illustrating an example of the operation related to the service registration phase of the authentication system according to the first example embodiment.

The management server 20 acquires personal information (information necessary for providing a service), a user ID, and a password from the user (step S01).

The management server 20 transmits a service registration request including the acquired user ID and password, and service provider ID to the authentication server 10 (step S02).

The authentication server 10 generates a service user ID using the acquired user ID and password, and the service provider ID (step S03).

The authentication server 10 stores the service provider ID and the service user ID in the authentication information database (step S04).

The authentication server 10 transmits a response including the service user ID (response to the service registration request) to the management server 20 (step S05).

The management server 20 stores the personal information acquired in step S01 and the service user ID acquired from the authentication server 10 in association with each other in the user information database (step S06).

Figure 26:
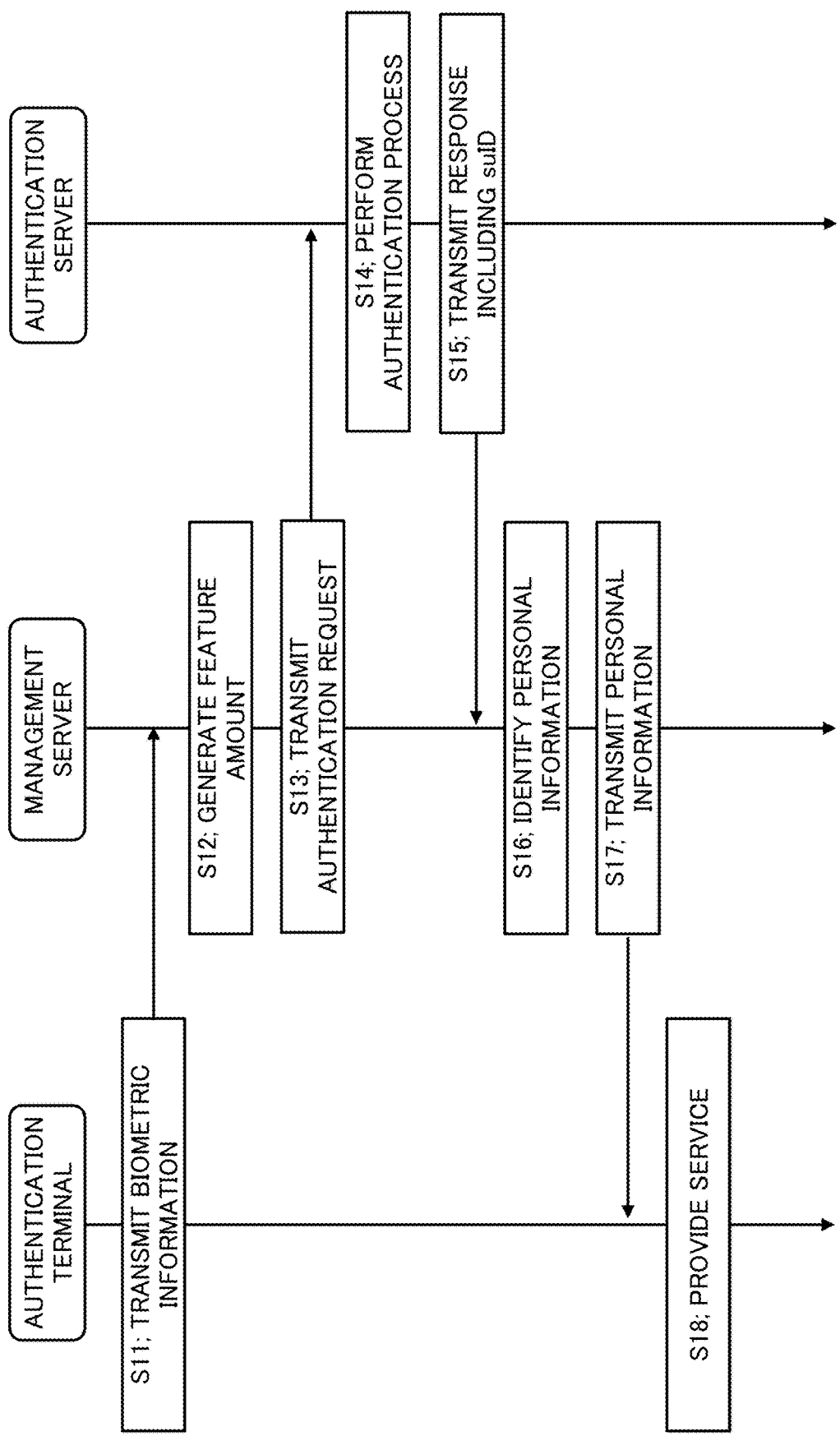
FIG. 26 is a sequence diagram illustrating an example of an operation related to a service providing phase of the authentication system according to the first example embodiment.

FIG. 26 is a sequence diagram illustrating an example of an operation related to a service providing phase of the authentication system according to the first example embodiment.

The authentication terminal 30 acquires a facial image (biometric information) of the user to transmit the acquired facial image to the management server 20 (step S11).

The management server 20 generates a feature amount from the acquired facial image (step S12).

The management server 20 transmits an authentication request including the generated feature amount and the service provider ID to the authentication server 10 (step S13).

The authentication server 10 executes an authentication process using the feature amount and the service provider ID included in the authentication request, and identifies the related service user ID (step S14).

The authentication server 10 transmits a response (response to the authentication request) including the identified service user ID to the management server 20 (step S15).

The management server 20 searches the user information database using the acquired service user ID, and identifies the related personal information (step S16).

The management server 20 transmits the identified personal information to the authentication terminal 30 (step S17).

The authentication terminal 30 provides a service using the acquired personal information (step S18).

As described above, in the authentication system according to the first example embodiment, the authentication server 10 determines whether to update the registered facial image based on similarity between the registered facial image and the update facial image. In a case where similarity between the two facial images is extremely high, the authentication server 10 determines that the facial image of the user initially registered in the system is used as a facial image for update, and updates the facial image. On the other hand, in a case where similarity between the two facial images is extremely low, the authentication server 10 determines that the facial image of a person different from the user initially registered in the system is used as a facial image for update, and rejects the update of the facial image. For example, in a case where the appearance or the like of the user changes with the lapse of time and similarity between the two facial images is slightly different, the authentication server 10 requests the user to submit an identity confirmation document. The authentication server 10 compares the verification facial image described in the identity confirmation document with the update facial image, and updates the facial image in a case where the identity of the person of the facial image to be used for the update can be confirmed. That is, in a case where it is unclear whether the user registered in the system and the updater of the facial image match only by the registered facial image and the update facial image, the matching between the system user and the update facial image provider is confirmed using the authentication server 10 and the identity confirmation document. As a result, authentication server 10 can prevent unauthorized update of the registered facial image.

In the authentication system according to the first example embodiment, the validity of the update facial image used for updating the facial image is verified using the facial image that was registered in the system at the beginning and the facial image described in the identity confirmation document. Therefore, the authentication server 10 can ensure necessary authentication accuracy by performing authentication using the new registered facial image (update facial image that has been verified). When authentication often fails, the user may consider that the registered facial image is old and inappropriate, and it is better to update the facial image. In this case, since the authentication server 10 updates the facial image after the verification, a facial image suitable for biometric authentication is registered in the system. That is, a facial image in which a user wears a mask or sunglasses is inappropriate for biometric authentication even though it is the latest facial image, and registration of such a facial image is excluded. As described above, in the first example embodiment, the registered facial image can be updated to a facial image suitable for biometric authentication while ensuring security.

Second Example Embodiment

Next, the second example embodiment will be described in detail with reference to the drawings.

In the first example embodiment, in a case where the registered facial image and the update facial image cannot be determined with high accuracy to be the facial images of the same person, an identity confirmation document is requested to be submitted. In a second example embodiment, a case where an identity confirmation document is requested to be submitted from the beginning of updating a registered facial image will be described.

Since the configuration of the authentication system according to the second example embodiment can be the same as that of the first example embodiment, the description related to FIG. 2 is omitted. Since the processing configurations of the authentication server 10, the management server 20, and the authentication terminal 30 according to the second example embodiment can also be the same as those of the first example embodiment, the description thereof will be omitted.

Hereinafter, differences between the first and second example embodiments will be mainly described.

Figure 27:
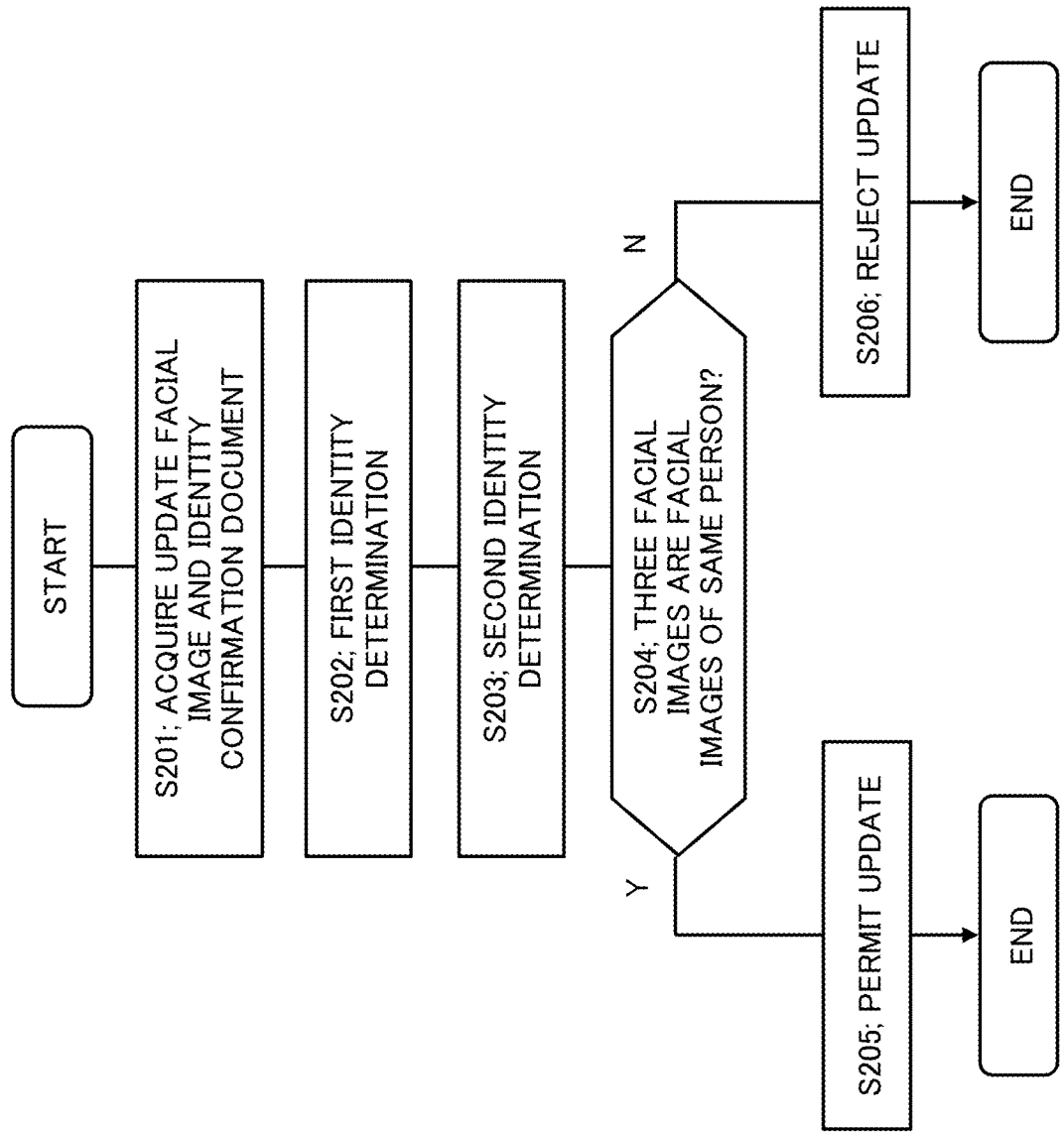
FIG. 27 is a flowchart illustrating an example of an operation related to a facial image update of a user management unit according to the second example embodiment.

FIG. 27 is a flowchart illustrating an example of the operation related to the facial image update of the user management unit 202 according to the second example embodiment.

After acquiring the user ID and the password using the GUI as illustrated in FIG. 12, the user management unit 202 acquires the update facial image and the identity confirmation document using the GUIs as illustrated in FIGS. 13 and 16 (step S201).

In the second example embodiment, the identity confirmation document may be a document input to the system at the beginning (identity confirmation document stored in the database), or may be a document selected according to a date or the like.

The user management unit 202 determines whether the registered facial image and the update facial image are facial images of the same person (first identity determination; step S202). Specifically, the user management unit 202 calculates similarity between the registered facial image and the update facial image. In a case where the calculated similarity is greater than a threshold value TH5, the user management unit 202 determines that the two facial images are facial images of the same person. In a case where the calculated similarity is equal to or less than the threshold value TH5, the user management unit 202 determines that the two facial images are not the facial images of the same person.

The user management unit 202 determines whether the update facial image and the verification facial image (facial image obtained from the identity confirmation document) are facial images of the same person (second identity determination; step S203). Specifically, the user management unit 202 calculates similarity between the update facial image and the verification facial image. In a case where the calculated similarity is greater than a threshold value TH6, the user management unit 202 determines that the two facial images are facial images of the same person. In a case where the calculated similarity is equal to or less than the threshold value TH6, the user management unit 202 determines that the two facial images are not the facial images of the same person.

In a case where it is determined, by the above two determinations, that the three facial images of the registered facial image, the update facial image, and the verification facial image are facial images of the same person (step S204: Yes branch), the user management unit 202 permits the update of the registered facial image (step S205).

In a case where it is determined that the registered facial image, the update facial image, and the verification facial image are not facial images of the same person (step S204, No branch), the user management unit 202 rejects the update of the registered facial image (step S206).

The threshold value TH5 and the threshold value TH6 may be the same value (reference) or different values. The threshold value TH5 and the threshold value TH6 may be values less than the threshold value TH2 described in the first example embodiment. In other words, the threshold values TH5 and the threshold TH6 used in the second example embodiment may be set to values that allow a change in the facial image accompanying a change in appearance or the like. In the second example embodiment, since the identity of the facial image updater is checked at the time of updating the facial image, the condition for determining the consistency between the images can be relaxed.

As described above, the authentication server 10 according to the second example embodiment determines whether the three facial images (registered facial image, update facial image, verification facial image) are facial images of the same person by two identity determinations. The authentication server 10 checks the identity between the system user and the updater of the facial image by executing the first identity determination. The authentication server 10 checks the identity of the updater of the facial image by executing the second identity determination. By performing such a double check, the authentication server 10 prevents unauthorized update of the registered facial image. For example, in a case where only the second identity determination is performed without performing the first identity determination, the registered facial image can be updated by preparing an identity confirmation document of another person and a facial image of the another person. In order to prevent such fraud, the authentication server 10 determines the identity of the three facial images and determines whether the facial image registered in the system can be updated.

Figure 28:
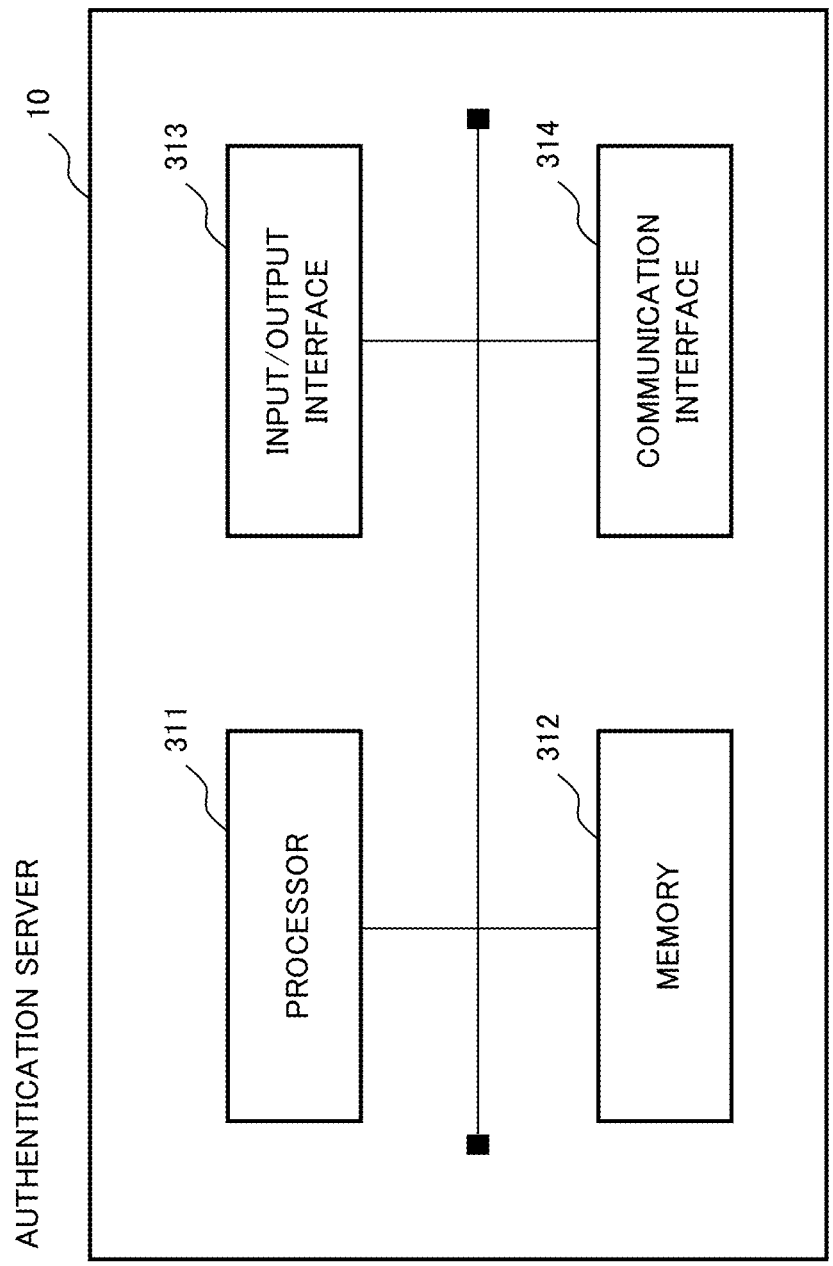
FIG. 28 is a diagram illustrating an example of a hardware configuration of an authentication server.

Next, hardware of each device constituting the authentication system will be described. FIG. 28 is a diagram illustrating an example of a hardware configuration of the authentication server 10.

The authentication server 10 can be configured by an information processing device (so-called computer), and has a configuration illustrated in FIG. 28. For example, the authentication server 10 includes a processor 311, a memory 312, an input/output interface 313, a communication interface 314, and the like. The components such as the processor 311 are connected by an internal bus or the like and are configured to be able to communicate with each other.

However, the configuration illustrated in FIG. 28 is not intended to limit the hardware configuration of the authentication server 10. The authentication server 10 may include hardware (not illustrated) or may not include the input/output interface 313 as necessary. The number of processors 311 and the like included in the authentication server 10 is not limited to the example of FIG. 28, and for example, a plurality of processors 311 may be included in the authentication server 10.

The processor 311 is a programmable device such as a central processing unit (CPU), a micro processing unit (MPU), or a digital signal processor (DSP). Alternatively, the processor 311 may be a device such as a field programmable gate array (FPGA) or an application specific integrated circuit (ASIC). The processor 311 is configured to execute an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display device or an input device (not illustrated). The display device is, for example, a liquid crystal display or the like. The input device is, for example, a device that receives a user operation such as a keyboard or a mouse.

The communication interface 314 is a circuit, a module, or the like that communicates with another device. For example, the communication interface 314 includes a network interface card (NIC) or the like.

The function of the authentication server 10 is implemented by various processing modules. The processing module is implemented, for example, by the processor 311 executing a program stored in the memory 312. The program can be recorded in a computer-readable storage medium. The storage medium may be a non-transient (non-transitory) medium such as a semiconductor memory, a hard disk, a magnetic recording medium, or an optical recording medium. That is, the present disclosure can also be embodied as a computer program product. The program can be downloaded via a network or updated using a storage medium storing the program. Furthermore, the processing module may be achieved by a semiconductor chip.

The management server 20, the authentication terminal 30, and the terminal 40 can also be configured by the information processing device as in the authentication server 10, and since there is no difference in the basic hardware configuration from the authentication server 10, the description thereof will be omitted. For example, the authentication terminal 30 may include a camera for imaging the user.

The authentication server 10, which is an information processing device, includes a computer and can implement the function of the authentication server 10 by causing the computer to execute a program. The authentication server 10 executes the facial image update method by the program.

[Modification]

The configuration, operation, and the like of the authentication system described in the above example embodiment are merely examples, and are not intended to limit the configuration and the like of the system.

In the above example embodiment, it is described that the user determines the user ID and the password, and identifies the user (system user) registered in the system using the user ID and the password. However, the authentication system may determine an ID (identifier) that uniquely identifies the system user. For example, in the user registration phase, the authentication server 10 acquires biometric information (facial image, feature amount) of the user. The authentication server 10 may generate the ID based on the biometric information. For example, the authentication server 10 may calculate a hash value from the feature amount of the facial image and use the calculated hash value instead of the user ID and the password. The feature amount of the facial image are different for each user, and the hash value generated from the feature amount is also different for each user, and thus, can be used as the ID of the system user.

In the above example embodiment, it is described that the user registration phase and the service registration phase are executed at different timings, but these phases may be executed at substantially the same timing. For example, the authentication terminal 30 installed in a service provider from which the user wants to receive a service may be used, and the above two registration phases may be executed. Specifically, the user may perform user registration (input biometric information, user ID, and password) using the authentication terminal 30, and then, may continuously perform service registration (input personal information, user ID, and password). In this case, the authentication terminal 30 may have a user registration function (user management unit 202) of the authentication server 10 and a personal information acquisition function (personal information acquisition unit 302) of the management server 20.

The plurality of authentication terminals 30 possessed by the service provider may not be installed on the same site, building, or the like. When the service providers are common, the respective authentication terminals 30 may be installed at spatially separated places.

In the above example embodiment, it is described that one service provider ID is assigned to one service provider, but one service provider ID may be assigned to a plurality of service providers. A plurality of service providers may be grouped as a group, and a service provider ID may be issued for each group. For example, in a case where the service providers S1 and S2 cooperate to provide the same service, a common service provider ID may be issued to the service providers S1 and S2.

In the above example embodiment, the case where the biometric information related to "the feature amount generated from the facial image" is transmitted from the management server 20 to the authentication server 10 is described. However, the biometric information related to the "facial image" may be transmitted from the management server 20 to the authentication server 10. In this case, the authentication server 10 may generate a feature amount from the acquired facial image and execute the authentication process (collation process).

In the above example embodiment, the case where the authentication terminal 30 acquires the facial image and the management server 20 generates the feature amount from the facial image is described. However, the authentication terminal 30 may generate a feature amount from the facial image to transmit the generated feature amount to the management server 20. That is, the management server 20 may not generate the feature amount.

In the above example embodiment, the case where the authentication server 10 stores the biometric information (Face image, feature amount) of the user and the management server 20 stores the personal information (name or the like) of the user is described. However, these two servers may be integrated, and the integrated server may store the biometric information and the personal information. That is, the authentication terminal 30 may transmit the biometric information to the integrated server, and the server may transmit the related personal information as a result of the authentication process to the authentication terminal 30.

In the above example embodiment, the case where the feature amount generated from the registered facial image is stored in the authentication information database is described, but the feature amount may not be stored in the database. The authentication server 10 may generate the feature amount from the registered facial image each time the authentication request is processed.

In the above example embodiment, it is described that identity confirmation using an identity confirmation document is performed at the time of system registration of a user, but the identity confirmation may be omitted. The identity confirmation of the system user may be individually performed by the service providing business operator. That is, the management server 20 may perform identity confirmation using biometric information (facial image) and an identity confirmation document. In this case, the management server 20 may delete the biometric information after completion of the identity confirmation.

Alternatively, the staff of the authentication center may perform identity confirmation using the facial image and the identity confirmation document acquired from the user, and input information (user ID, password, and facial image) of the user whose identity is reliable to the authentication server 10.

In the above example embodiment, it is described that the old feature amount and facial image are deleted (overwrite with new feature amount, facial image) when the facial image is updated, but the old feature amount and facial image may also be left in the database. In a case where an old feature amount remains, the authentication server 10 may also use the old feature amount for the collation process. For example, in a case where the collation process using the new feature amount (updated feature amount) is not successful, the authentication server 10 may use the old feature amount for the collation process. With such a measure, a slight change in appearance or the like can be absorbed, and authentication accuracy can be improved.

A form of data transmission and reception between the devices (authentication server 10, management server 20, and authentication terminal 30) is not particularly limited, but data transmitted and received between the devices may be encrypted. Biometric information is transmitted and received between these devices, and it is desirable that encrypted data is transmitted and received in order to appropriately protect the biometric information.

The authentication server 10 may prompt the user to update the registered facial image and the identity confirmation document. Specifically, in a case where a predetermined period (for example, three years) has elapsed since the latest update (registration) of the registered facial image, the authentication server 10 notifies the user (the terminal 40 of the user) of urging the user to update the facial image. That is, the user management unit 202 of the authentication server 10 may prompt the user to update the registered facial image in a case where a predetermined period has elapsed since the registered facial image was registered or updated. As in the identity confirmation document, the authentication server 10 may notify the terminal 40 of prompting the update of the identity confirmation document.

In the above example embodiment, it is described that the terminal 40 of the user is used for updating the facial image. The terminal 40 may be used for a purpose other than the updating of the facial image. For example, the user may update other information registered in the authentication server 10 using the terminal 40. For example, the user may access the authentication server 10 using the terminal 40 and select a service provider from whom the user receives the provision of the service by the biometric authentication. That is, the user may perform service registration via the authentication server 10. At this time, when the number of service providers is large, a service provider whose use frequency is low or a service provider who has not been used recently may be preferentially displayed. Alternatively, the user may apply for withdrawal from the system or service using the terminal 40.

In the flow chart (flowchart and sequence diagram) used in the above description, a plurality of steps (processes) is described in order, but the execution order of the steps executed in the example embodiment is not limited to the described order. In the example embodiment, for example, the order of the illustrated steps can be changed within a range in which there is no problem in terms of content, such as executing each step in parallel.

The above example embodiments have been described in detail in order to facilitate understanding of the present disclosure, and it is not intended that all the configurations described above are necessary. In a case where a plurality of example embodiments is described, each example embodiment may be used alone or in combination. For example, part of the configuration of the example embodiment can be replaced with the configuration of another example embodiment, or the configuration of another example embodiment can be added to the configuration of the example embodiment. Furthermore, it is possible to add, delete, and replace other configurations for part of the configuration of the example embodiment.

Although the industrial applicability of the present disclosure is apparent from the above description, the present disclosure can be suitably applied to an authentication system that authenticates a customer of a retail store, a hotel business or the like. However, the application of the disclosure of the present application is not limited to the authentication system, and the disclosure of the present application is suitable for a system that updates biometric information (in particular, the registered facial image).

The whole or part of the example embodiments disclosed above can be described as, but not limited to, the following Supplementary Notes.

Supplementary Note 1

An information processing device including
a database that stores a first facial image of a user, and
an update unit that determines, at least according to similarity between the first facial image and a second facial image, whether to update the first facial image to the second facial image.

Supplementary Note 2

The information processing device according to Supplementary Note 1, wherein the update unit updates the first facial image in a case where similarity between the first facial image and the second facial image is greater than a first threshold value.

Supplementary Note 3

The information processing device according to Supplementary Note 2, wherein the update unit does not update the first facial image in a case where similarity between the first facial image and the second facial image is less than a second threshold value.

Supplementary Note 4

The information processing device according to Supplementary Note 3, wherein in a case where similarity between the first facial image and the second facial image is equal to or greater than the second threshold value and equal to or less than the first threshold value, the update unit acquires an identity confirmation document of the user, extracts a third facial image from the identity confirmation document, and determines whether to update the first facial image according to similarity between the second facial image and the third facial image.

Supplementary Note 5

The information processing device according to Supplementary Note 4, wherein
the update unit
updates the first facial image in a case where similarity between the first facial image and the third facial image is greater than a third threshold value, and
does not update the first facial image in a case where similarity between the first facial image and the third facial image is equal to or less than the third threshold value.

Supplementary Note 6

The information processing device according to Supplementary Note 1, wherein
the update unit
acquires an identity confirmation document of the user and extracts a third facial image from the identity confirmation document,
performs a first identity determination of determining whether the first facial image and the second facial image are facial images of a same person,
performs a second identity determination of determining whether the second facial image and the third facial image are facial images of the same person, and
determines whether to update the first facial image based on a result of the first identity determination and the second identity determination.

Supplementary Note 7

The information processing device according to Supplementary Note 6, wherein the update unit updates the first facial image in a case where the first facial image, the second facial image, and the third facial image are determined to be facial images of the same person by the first identity determination and the second identity determination.

Supplementary Note 8

The information processing device according to any one of Supplementary Notes 4 to 7, wherein the update unit determines whether to extract the third facial image based on a description of the identity confirmation document.

Supplementary Note 9

The information processing device according to any one of Supplementary Notes 1 to 8, wherein the update unit acquires the second facial image after the user logs in.

Supplementary Note 10

The information processing device according to any one of Supplementary Notes 1 to 9, wherein the database stores the first facial image and a feature amount generated from the first facial image in association with each other.

Supplementary Note 11

The information processing device according to any one of Supplementary Notes 1 to 10, wherein the update unit stores a feature amount generated from the second facial image in the database.

Supplementary Note 12

The information processing device according to any one of Supplementary Notes 1 to 11, wherein the update unit prompts the user to update the first facial image in a case where a predetermined period has elapsed since the first facial image was registered or updated.

Supplementary Note 13

A system including
a terminal, and
an information processing device including a database that stores a first facial image of a user and an update unit that determines, at least according to similarity between the first facial image and a second facial image, whether to update the first facial image to the second facial image, wherein
the terminal inputs the second facial image to the information processing device according to an operation of the user.

Supplementary Note 14

A method of updating a facial image, where the method including
an information processing device
storing a first facial image of a user, and
determining, at least according to similarity between the first facial image and a second facial image, whether to update the first facial image to the second facial image.

Supplementary Note 15

A computer-readable storage medium storing a program for causing a computer mounted on an information processing device to execute
a process of storing a first facial image of a user, and
a process of determining, at least according to similarity between the first facial image and a second facial image, whether to update the first facial image to the second facial image.

The disclosures of the cited prior art documents are incorporated herein by reference. While the exemplary example embodiments of the present disclosure have been described, the disclosure is not limited to these example embodiments. It will be understood by those of ordinary skill in the art that these example embodiments are exemplary only and that various variations may be made therein without departing from the scope and spirit of the present disclosure as defined by the claims. That is, it goes without saying that the present disclosure includes various modifications and corrections that can be made by those of ordinary skill in the art in accordance with the entire disclosure including the claims and the technical idea.

REFERENCE SIGNS LIST 10 authentication server
20 management server
30 authentication terminal
40 terminal
100 information processing device
101 database
102 update unit
201, 301, 401 communication control unit
202 user management unit
203, 304 database (DB) management unit
204 service registration unit
205 authentication unit
206, 306, 405 storage unit
302 personal information acquisition unit
303 service registration request unit
305 authentication request unit
311 processor
312 memory
313 input/output interface
314 communication interface
402 biometric information acquisition unit
403 service providing unit
404 message output unit

What is claimed is:

1. An information processing device comprising:
a memory storing a database that stores a first facial image of a user; and
at least one processor coupled to the memory,
the at least one processor performing operations to:
acquire the first facial image of the user and an identity confirmation document of the user,
extract a second facial image from the identity confirmation document,
based on a similarity between the first facial image and the second facial image being equal to or greater than a first threshold value, store the first facial image to the database and discard the identity confirmation document,
acquire a third facial image and a new identity confirmation document of the user,
extract a fourth facial image from the new identity confirmation document, and
determine, based on a similarity between the stored first facial image and the third facial image and a similarity between the third facial image and the fourth facial image, whether to update the stored first facial image to the third facial image.

2. The information processing device according to claim 1, wherein the at least one processor further performs operation to:
update the stored first facial image based on the similarity between the stored first facial image and the third facial image is being greater than a second threshold value.

3. The information processing device according to claim 2, wherein the at least one processor further performs operation to:
  not update the stored first facial image based on the similarity between the stored first facial image and the third facial image being less than a third threshold value.

4. The information processing device according to claim 3, wherein the at least one processor further performs operation to:
  wherein based on the similarity between the stored first facial image and the third facial image being equal to or greater than the third threshold value and equal to or less than the second threshold value:
    acquire the new identity confirmation document of the user, extract the fourth facial image from the identity confirmation document, and determine whether to update the stored first facial image based on the similarity between the third facial image and the fourth facial image.

5. The information processing device according to claim 4, wherein the at least one processor further performs operation to:
  update the stored first facial image based on the similarity between the stored first facial image and the fourth facial image is greater than a fourth threshold value, and
  not update the stored first facial image based on the similarity between the stored first facial image and the fourth facial image is equal to or less than the fourth threshold value.

6. The information processing device according to claim 1, wherein the at least one processor further performs operation to:
  perform a first identity determination of determining whether the stored first facial image and the second third facial image are facial images of a same person,
  perform a identity determination of determining whether the third facial image and the fourth facial image are facial images of the same person, and
  determine whether to update the stored first facial image based on a result of the first identity determination and the second identity determination.

7. The information processing device according to claim 6, wherein the at least one processor further performs operation to:
  update the stored first facial image based on the stored first facial image, the third facial image, and the fourth facial image being determined to be facial images of the same person by the first identity determination and the second identity determination.

8. The information processing device according to claim 4, wherein the at least one processor further performs operation to:
  update whether to extract the fourth facial image based on a description of the new identity confirmation document.

9. The information processing device according to claim 1, wherein the at least one processor further performs operation to:
  acquire the third facial image after the user logs in.

10. The information processing device according claim 1, wherein the database stores the first facial image and a feature amount generated from the first facial image in association with each other.

11. The information processing device according to claim 1, wherein the at least one processor further performs operation to:
  store a feature amount generated from the third facial image in the database.

12. The information processing device according to claim 1, wherein the at least one processor further performs operation to:
  prompt the user to update the stored first facial image based on a predetermined period elapsing since the stored first facial image was registered or updated.

13. A system comprising:
  a terminal; and
  an information processing device including a memory storing a database that stores a first facial image of a user, and at least one processor coupled to the memory, the at least one processor performing operations to:
    acquire the first facial image of the user and an identity confirmation document of the user,
    extract a second facial image from the identity confirmation document,
    based on a similarity between the first facial image and the second facial image being equal to or greater than a first threshold value, store the first facial image to the database and discard the identity confirmation document,
    acquire a third facial image and a new identity confirmation document of the user,
    extract a fourth facial image from the new identity confirmation document, and
    determine, based on a similarity between the first facial image and the third facial image and a similarity between the third facial image and the fourth facial image, whether to update the first facial image to the second facial image,
  wherein the terminal inputs the third facial image to the information processing device according to an operation of the user.

14. A method of updating a facial image in an information processing device, the method comprising:
  acquiring a first facial image of a user and an identity confirmation document of the user,
  extracting a second facial image from the identity confirmation document,
  based on a similarity between the first facial image and the second facial image being equal to or greater than a first threshold value, storing the first facial image to a database and discard the identity confirmation document,
  acquiring a third facial image and a new identity confirmation document of the user,
  extracting a fourth facial image from the new identity confirmation document, and
  determining, based on a similarity between the stored first facial image and the third facial image and a similarity between the third facial image and the fourth facial image, whether to update the stored first facial image to the third facial image.

15. A non-transitory computer-readable storage medium storing a program for causing a computer mounted on an information processing device to execute:
  acquiring a first facial image of a user and an identity confirmation document of the user,
  extracting a second facial image from the identity confirmation document,
  based on a similarity between the first facial image and the second facial image being equal to or greater than a first threshold value, storing the first facial image to a database and discard the identity confirmation document, acquiring a third facial image and a new identity confirmation document of the user, extracting a fourth facial image from the new identity confirmation document, and determining, based on a similarity between the first facial image and the third facial image and a similarity between the third facial image and the fourth facial image, whether to update the stored first facial image to the third facial image.

\* \* \* \* \*